(12) United States Patent
Glazier

(10) Patent No.: US 10,229,427 B2
(45) Date of Patent: Mar. 12, 2019

(54) VIRTUAL KEYBOARD TRACKABLE REFERRAL SYSTEM

(71) Applicant: WILDFIRE SYSTEMS, INC., Rancho Santa Fe, CA (US)

(72) Inventor: Jordan Glazier, Rancho Santa Fe, CA (US)

(73) Assignee: WILDFIRE SYSTEMS, INC., Rancho Sante Fe, CA (US)

( * ) Notice: Subject to any disclaimer, the term of this patent is extended or adjusted under 35 U.S.C. 154(b) by 0 days.

(21) Appl. No.: 15/483,791

(22) Filed: Apr. 10, 2017

(65) Prior Publication Data

US 2018/0293601 A1    Oct. 11, 2018

(51) Int. Cl.
| | |
|---|---|
| G06Q 30/02 | (2012.01) |
| G06Q 50/00 | (2012.01) |
| G06F 3/0488 | (2013.01) |
| G06F 3/16 | (2006.01) |

(Continued)

(52) U.S. Cl.
CPC ....... G06Q 30/0214 (2013.01); G06F 3/0237 (2013.01); G06F 3/04886 (2013.01); G06F 3/167 (2013.01); G06F 17/2765 (2013.01); G06Q 50/01 (2013.01)

(58) Field of Classification Search
None
See application file for complete search history.

(56) References Cited

U.S. PATENT DOCUMENTS

| | | | |
|---|---|---|---|
| 7,664,726 B2 * | 2/2010 | Jain | G06Q 30/02 |
| | | | 705/14.16 |
| 8,027,883 B2 | 9/2011 | Donaldson | |
| 8,103,547 B2 | 1/2012 | Mah et al. | |

(Continued)

FOREIGN PATENT DOCUMENTS

WO    2016046824 A1    3/2016

OTHER PUBLICATIONS

"Self-expression shouldn't be limited to text", webpage retrieved on Apr. 17, 2017, from http://tapslash.com/features, 8 pages.

(Continued)

*Primary Examiner* — Colleen A Hoar
(74) *Attorney, Agent, or Firm* — Arc IP Law, PC; Joseph J. Mayo

(57) ABSTRACT

A virtual keyboard trackable referral system that inserts trackable referral links into communications from a referring user to one or more recipients, and credits the referring user for actions or transactions resulting from these referrals. Uses a referral matcher coupled with a virtual keyboard, so that it is usable with any application or service that uses the keyboard. The referral matcher analyzes text or audio input to identify matches from a database of participating products, services, and merchants, and offers the user the option to insert a referral link to matching items. The matcher may also obtain and analyze other input, including audio or images. If a recipient uses the referral link and completes the action, a referral tracker credits the referring user. Referral links may initially direct a recipient to an intermediate server that may perform additional matching and selection and then redirect the recipient to a target destination.

23 Claims, 16 Drawing Sheets

(51) Int. Cl.
*G06F 3/023* (2006.01)
*G06F 17/27* (2006.01)

(56) References Cited

U.S. PATENT DOCUMENTS

| | | | |
|---|---|---|---|
| 8,521,818 B2 | 8/2013 | McGann et al. | |
| 9,189,472 B2* | 11/2015 | Medlock | G06F 3/04883 |
| 9,348,813 B2* | 5/2016 | Mankovich | G06F 17/30731 |
| 2005/0149851 A1 | 7/2005 | Mittal | |
| 2006/0129455 A1 | 6/2006 | Shah | |
| 2011/0004525 A2 | 1/2011 | Byrne | |
| 2011/0145057 A1 | 6/2011 | Jones et al. | |
| 2012/0041838 A1 | 2/2012 | Serbanescu | |
| 2012/0084160 A1 | 4/2012 | Badros et al. | |
| 2012/0173367 A1 | 7/2012 | Soroca et al. | |
| 2012/0215871 A1 | 8/2012 | Zhang | |
| 2012/0316948 A1 | 12/2012 | Shipley et al. | |
| 2013/0066722 A1* | 3/2013 | Alkatib | G06Q 30/02 705/14.64 |
| 2013/0173367 A1 | 7/2013 | Beighley, Jr. | |
| 2013/0204703 A1 | 8/2013 | Carlson et al. | |
| 2013/0246225 A1 | 9/2013 | Biltz | |
| 2014/0067501 A1 | 3/2014 | Rozenvasser | |
| 2014/0172812 A1* | 6/2014 | Chisalita | G06F 17/30637 707/706 |
| 2014/0282016 A1* | 9/2014 | Hosier, Jr. | H04W 4/08 715/733 |
| 2014/0292016 A1 | 10/2014 | Masuda | |
| 2015/0007307 A1* | 1/2015 | Grimes | G09B 5/08 726/18 |
| 2015/0019203 A1* | 1/2015 | Smith | G06F 17/30796 704/9 |
| 2016/0283951 A1 | 9/2016 | Boss et al. | |
| 2017/0011383 A1 | 1/2017 | Melzer | |
| 2018/0182014 A1 | 6/2018 | Cheng | |

OTHER PUBLICATIONS

Pierce, David, "Super-Smart Apps are Invading our Keyboards", web article dated Sep. 22, 2015, retrieved from https://www.wired.com/2015/09/keyboards-invaded-super-smart-apps/, Wired, 9 pages.

"ThirstyAffiliates Autolinker Add-On", webpage retrieved on Apr. 19, 2017, retrieved from https://thirstyaffiliates.com/product/thirstyaffiliates-autolinker-addon, 6 pages.

Grant, Rebecca, "SkimLinks helps publishers nail affiliate marketing, no wooing required", web article dated Apr. 22, 2013, retrieved from https://venturebeat.com/2013/04/22/skimlinks-helps-publishers-nail-affiliate-marketing-no-wooing-required/, Venture Beat, 4 pages.

"Skimlinks Launches SkimWords 2.0, an Advanced In-text Monetization Solution Driving E-Commerce", web article dated Oct. 26, 2011, retrieved from http://www.prnewswire.com/news-releases/skimlinks-launches-skimwords-20-an-advanced-in-text-monetization-solution-driving-e-commerce-132606883.html, PR Newswire, 3 pages.

Webpage retrieved on Apr. 19, 2017, retrieved from http://www.affilinker.com/affiliate-wordpress-plugin/, AffiLinker, 10 pages.

Webpage retrieved on Apr. 19, 2017, retrieved from http://www.viglink.com/, VigLink, 4 pages.

"Instant Links Inserter—Convert Words to Links", Webpage retrieved on Apr. 19, 2017, retrieved from http://www.affiliateswitchblade.com/content-creation/instant-links-inserter.htm, Affiliates Switch Blade, 9 pages.

Patterson, Ben, "Too much tapping? Create your own Android and iOS keyboard shortcuts", web article dated Nov. 14, 2014, retrieved from http://www.pcworld.com/article/2847469/too-much-tapping-create-your-own-android-and-ios-keyboard-shortcuts.html, PCWORLD, 2 pages.

"How to use Shortcuts with SwiftKey Keyboard for Android", web article retrieved on Apr. 19, 2017 from https://support.swiftkey.com/hc/en-us/articles/213711789-How-to-use-Shortcuts-with-SwiftKey-Keyboard-for-Android, SwiftKey Support, 3 pages.

Raj, Vijay, "Meet Xploree, an Intelligent NLP Powered Keyboard for Android", web article dated Nov. 19, 2016, retrieved from https://www.tech.ink/1324/meet-xploree-keyboard-android, Tech Ink, 10 pages.

"What's the difference between predictive keyboards and predictive text?", web article dated Nov. 12, 2014, retrieved from https://blog.swiftkey.com/whats-difference-predictive-keyboards-predictive-text/, SwiftKey Blog, 5 pages.

Henry, Alan, "How Predictive Keyboards Work (and How You Can Train Yours Better)", web article dated Oct. 8, 2014, retrieved from http://lifehacker.com/how-predictive-keyboards-work-and-how-you-can-train-yo-1643795640, Lifehacker, 10 pages.

International Search Report and Written Opinion received in PCT/US18/25223, dated Jun. 22, 2018 (6 pages).

* cited by examiner

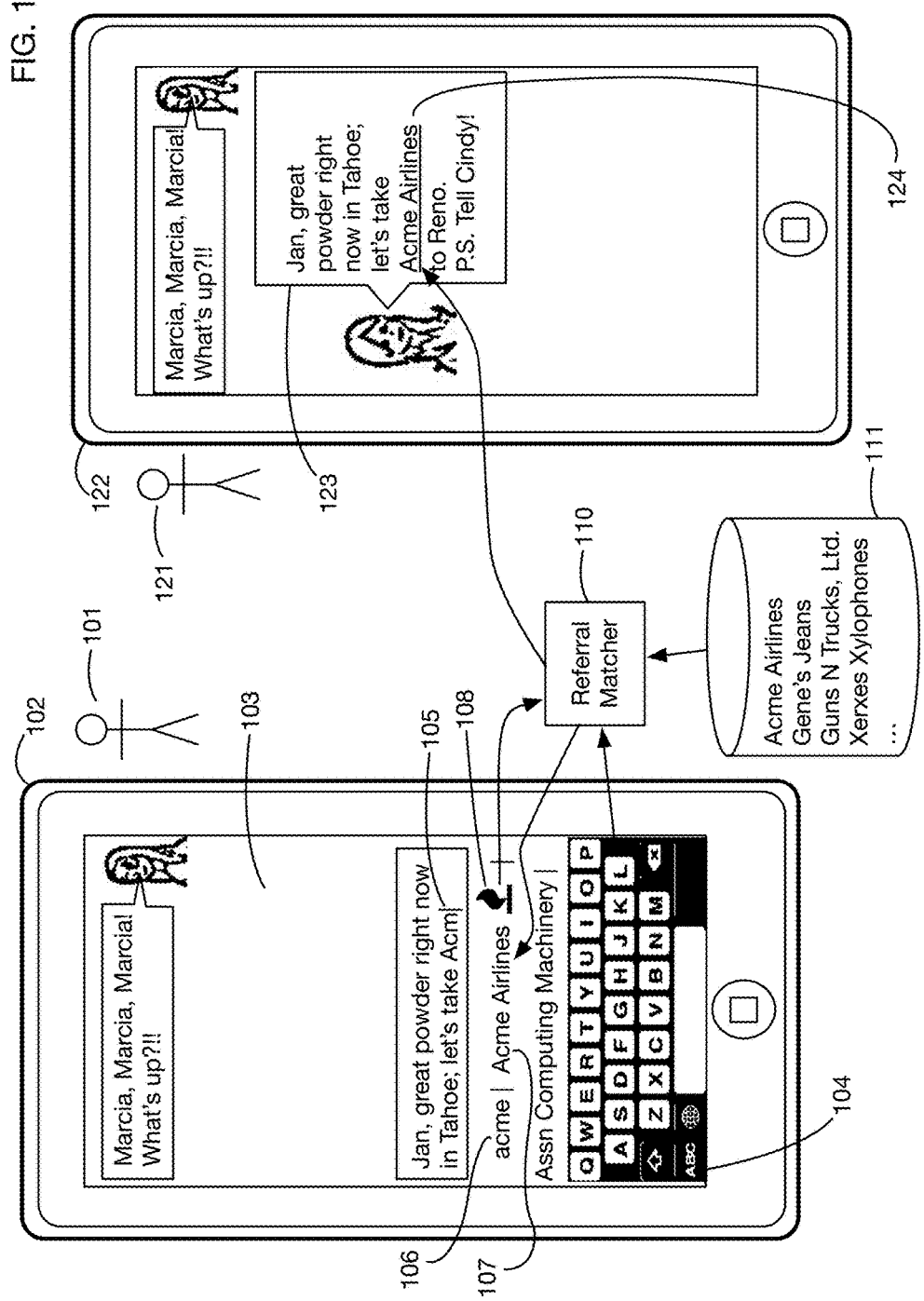

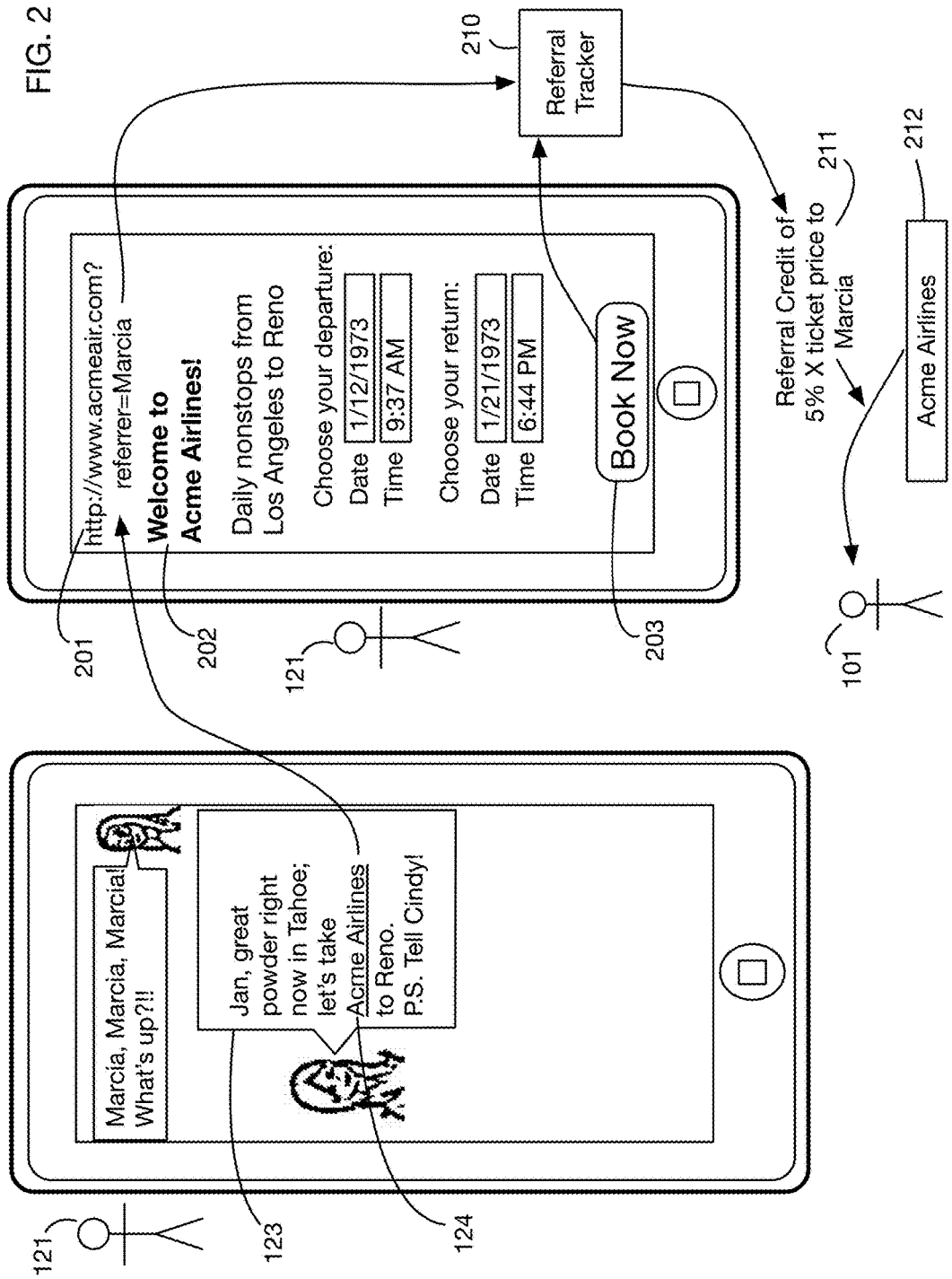

Process Flow with Two Stage Referral Matching

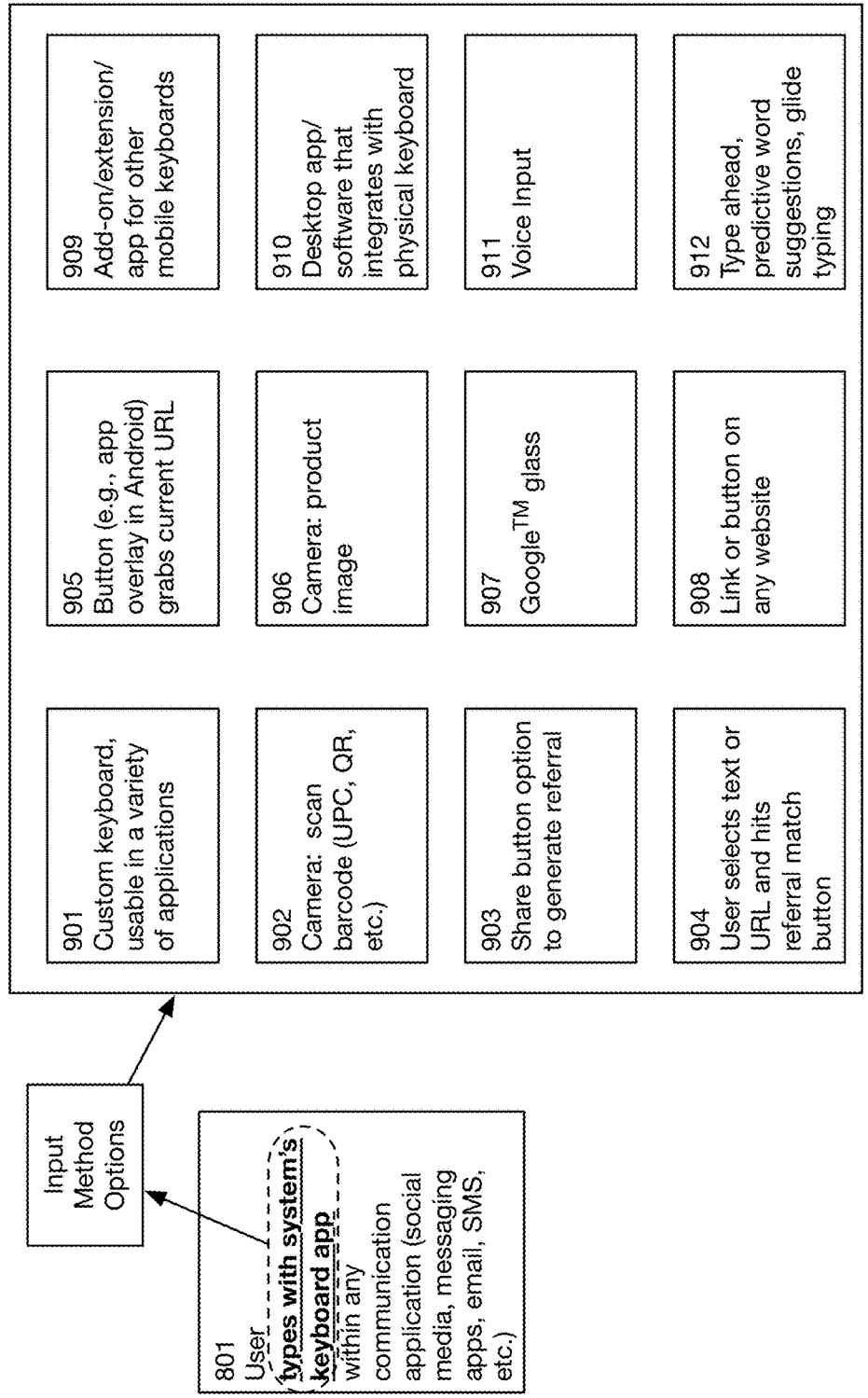

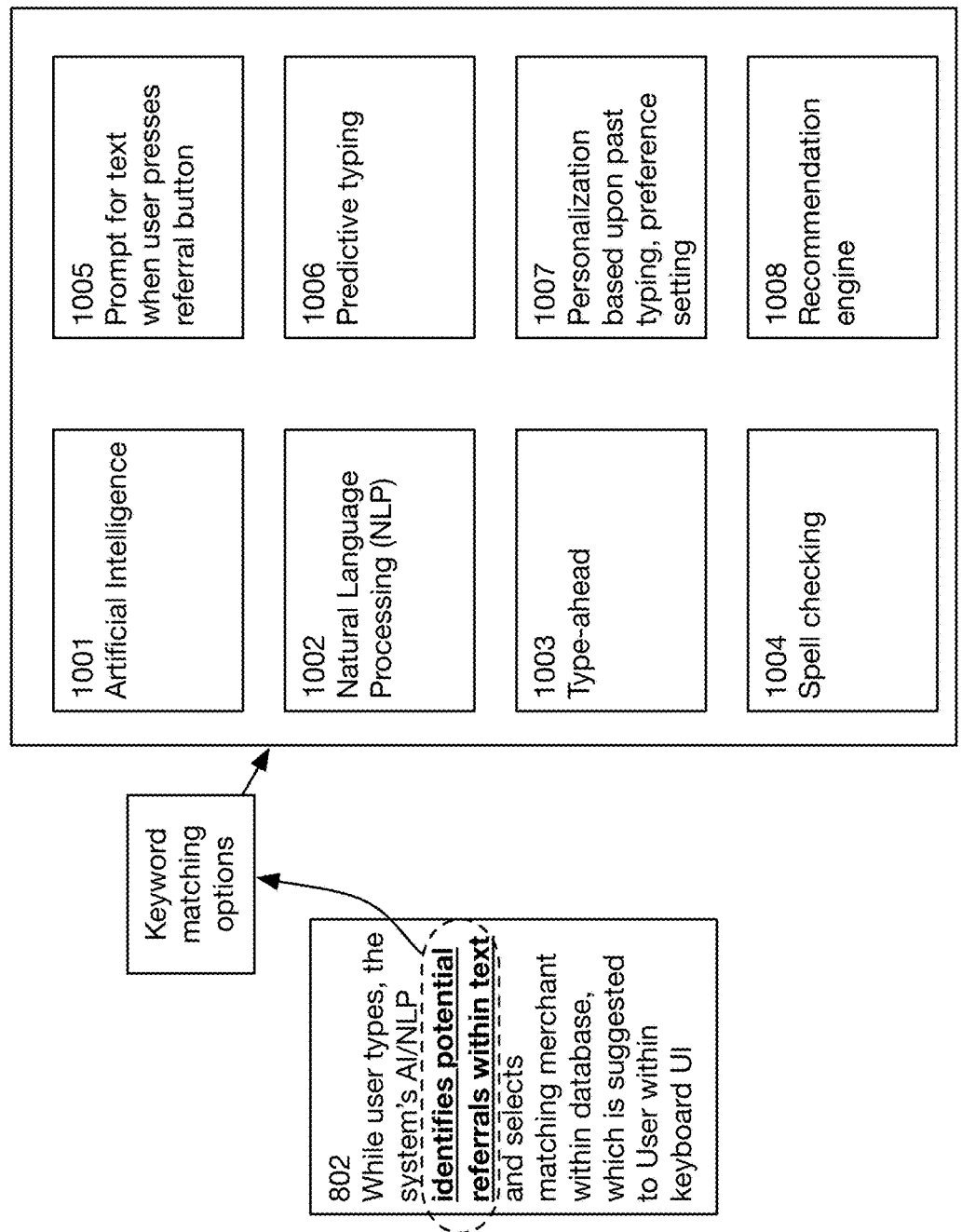

Share Button Process Flow

VIRTUAL KEYBOARD TRACKABLE REFERRAL SYSTEM

BACKGROUND OF THE INVENTION

Field of the Invention

One or more embodiments of the invention are related to the fields of data processing, electronic communication systems, referral reward systems for example as related to electronic commerce. More particularly, but not by way of limitation, one or more embodiments of the invention enable a virtual keyboard trackable referral system, for example that utilizes at least one computer and at least one application specifically programmed to integrate trackable referrals into peer-to-peer communications and track the referrals to provide rewards.

Description of the Related Art

Several technology platforms exist for digital promotion of advertisers, brands, products, and services. However, these existing platforms fail to address digital word-of-mouth promotion, or peer-to-peer digital communications, where one consumer promotes a brand, product or service to other consumers. Existing platforms include affiliate networks, social marketing, referral marketing, and influencer marketing. None of these existing platforms adequately address digital word-of-mouth promotion.

Affiliate networks are designed for professional content creators and digital publishers. These networks are not appropriate for consumer word-of-mouth promotion, because consumers are generally unable or unwilling to participate in the potentially painstaking processes required to join an affiliate network, and to perform the steps involved in utilizing an affiliate network.

Social marketing platforms are typically limited to display of advertisements on social networks. As such these platforms are not actually "social" since they do not directly involve communications between consumers; instead ads simply appear adjacent to social interactions, sometimes utilizing optimization software, for example to make the ads contextually relevant to the social interaction.

Referral marketing platforms generally involve customized, one-off campaigns on behalf of an individual advertiser. These platforms are not built as a platform for consumer digital word-of-mouth promotion across multiple products, services, or brands.

Influencer marketing platforms enlist influencers with large audiences for one-off campaigns. These platforms do not address true digital peer-to-peer word-of-mouth referrals among family and friends, for example.

There are no known platforms that provide practical and effective digital word-of-mouth referral capabilities to consumers who are engaged in peer-to-peer communications. There are no known platforms that are unobtrusive, automatic, simple, easy to use, intuitive, and that fit naturally within a peer-to-peer social dialogue. There are no known platforms that apply to essentially all prominent digital channels that people use to communicate with friends, family, and colleagues, such as social media, messaging applications, email, and SMS. There are no known platforms that easily enable people to embed trackable referral links within their digital communications with peers, provide rewards to the referrers, including cash-based incentives, and that provide a broad range of coverage of things the user recommends. There are no known platforms that integrate naturally within social dialogues and are helpful to the recipient, transparent, and non-promotional.

Some existing systems facilitate insertion of referral links into specific documents, such as blogs or web pages. These systems may for example be tools provided by affiliate networks, or plugins for web publishing tools such as WordPress®. A significant limitation of these systems is that they are coupled to specific applications or use cases. There are no known systems that integrate referral generation into general-purpose user input methods, such as a virtual keyboard for a mobile device, such that the referral generation capability can be used across multiple applications or use cases.

For at least the limitations described above there is a need for a virtual keyboard trackable referral system that generates trackable referrals in peer-to-peer communications between a referring user and a receiving user and tracks the referrals to provide rewards in a manner that is universal for all methods of communications between the referring user and receiving user.

BRIEF SUMMARY OF THE INVENTION

One or more embodiments described in the specification are related to a virtual keyboard trackable referral system that generates trackable referrals in peer-to-peer communications and tracks the referrals to provide rewards in a manner that is universal for all methods of communications between users. Embodiments of the invention may enable users to integrate referrals to participating merchants into their communications with other users; recipients of these referrals may digitally access the referred merchant, and the system may provide a credit to the referrer if a recipient completes a transaction with the referred merchant. Referral generation may be integrated into a virtual keyboard, so that the referral capability may be used across multiple applications and for multiple use cases.

One or more embodiments of the invention include a database of participating merchants, a referral matcher that generates referrals to these merchants, and a referral tracker that tracks when a referral results in a transaction. The referral matcher may receive input from a referring user, for example as part of a communication generated by this referring user; it may then analyze this input to identify one or more products, services, or merchants in the database that match the input. The referral matcher may then automatically generate a referral link and may insert this referral link into the communication. The referral matcher may automatically insert the referral link into the communication, or the referral matcher may prompt the referring user to agree to the insertion of the referral link and may then insert the referral link into the communication. The referral link may also incorporate an identifier of the referring user, so that the referral may be tracked. A recipient, or receiving user, of the communication, may use the referral link to access a web site or "site" or commerce site associated with the referred merchant. If the recipient performs a task, for example a transaction on this commerce site, the referral tracker may credit the referring user for the successful referral. This credit may be collected from the referred merchant.

One or more embodiments of the system may analyze input associated with any type of digital communication, including for example, without limitation, a text message, an email message, a posting on a social media site, a posting on a message board, a communication via a social messaging app, a Twitter® message, a Facebook® post, a Snapchat® message, a voice message, a video message, and a picture message.

In one or more embodiments, a communication from a referring user may include or may be generated by sharing of information via a share button or other sharing capability. A share button may for example be a native share button in a mobile operating system (such as iOS® or Android®), or it may be a button or an icon on a website or on any other document or application.

In one or more embodiments, a referral tracker may generate a feedback message to the referring user that indicates that a recipient has executed a transaction as a result of the referral. In addition to or instead of feedback, the referral may generate a credit to the referring user, which may for example be a monetary payment or another type of reward. In one or more embodiments, the referral credit may be provided to a group of users. In one or more embodiments, the referral credit may be shared with the recipient as a result of executing the referred transaction. In one or more embodiments, the referral credit may be a donation to another organization, for example a non-profit or charitable organization, made for example on behalf of the referring user.

Input into a referral matcher may be obtained from any type of physical device, application, utility, or software program, or combination thereof, and it may be in any format. For example, in one or more embodiments the referral matcher may be coupled to a physical or virtual keyboard used by the referring user, and it may accept and analyze keystrokes obtained from this keyboard. In one or more embodiments, the referral matcher may be coupled to an image capture device, such as for example a camera on a mobile device; the referral matcher may analyze images to determine matching products, services, or merchants. Images may be for example, without limitation, images of barcodes (linear and 2D codes such as QR codes), or images of a product. In one or more embodiments, the referral matcher may be coupled to an audio input device, such as for example a microphone on a mobile device; the referral matcher may perform voice recognition and analysis to determine matching products, services, or merchants, for example associated with the inferred reference in the communication.

In one or more embodiments, a referring user may be able to select text (or other items) in a communication, and initiate a search for items in the merchant database matching the selection.

One or more embodiments may use language processing and analysis techniques to identify words, phrases, or other elements in the input that are associated with one or more products, services, or merchants in the database. These techniques may include for example, without limitation, natural language processing, collaborative filtering, artificial intelligence, affect analysis, type-ahead, predictive analytics, machine learning, recommendation engine, and personalization engine.

If multiple merchants in a database are identified by the referral matcher as potential matches, based on the communication between the users, the system may ask the referring user to select from among the multiple matches. In one or more embodiments, the system may select a specific merchant automatically. Selection of a merchant may be based on any factor or factors on which merchants may be rated, scored, measured, or compared, including for example, without limitation, the size or amount of the referral credit associated with each merchant, the location of the merchant, the availability of inventory, speed of fulfillment of orders, ratings or reviews related to the merchant, or the price of the product or service offered by the merchant. The referring user and receiving user may both set preferences that for example invoke a strategy pattern to determine the merchant to provide a referral to, or to generate an ordered list of merchants. For example, the system may automatically select the merchant having the largest referral credit, or automatically select the merchant having the lowest price, quickest delivery time, etc. In one or more embodiments, the referral may be made based on the recipient's preferences, so that the recipient's favorite merchant's may be inserted into a list presented to the referring user and/or by the receiving user in one or more embodiments. Other strategy instances may be utilized to correlate the preferences of the referring user with the preferences of the receiving user to find the most appropriate referral as well.

One or more embodiments may incorporate settings which enable the referring user to control the frequency and manner in which the referral matcher presents matching merchants and prompts the referring user to agree to the insertion of the referral link.

In one or more embodiments, a referral link may initially direct a recipient to an intermediate server or system; this intermediate server may then redirect the recipient to a target destination related to the referral. The intermediate server may perform additional processing to determine which target destination is appropriate or optimal for the referral. For example, without limitation, in one or more embodiments the referral matcher executing on a referring user's device (such as a matcher integrated into or coupled to a virtual keyboard) may perform an initial match that simply identifies that a relevant product, service, brand, or merchant exists, or that selects a broad category or grouping of potentially matching products, services, brands, or merchants. The referral link associated with this initial match may direct the recipient to the intermediate server, which may then perform an additional matching step to select a specific merchant, site, page, or other destination to complete the referral. The redirection link generated to this final destination may contain the same or similar tracking information (such as an identity of the referring user) so that the referrer may obtain credit for a successful referral. The redirection link may direct the recipient for example to any or all of a web site, another server, another intermediate server, a web service, a specific web page, an application, a URL, or a URI. A potential benefit of this two-stage matching process using an intermediate server is that the database accessible to the referral matcher on the user's device can be smaller, and does not need to be updated in real time. The processing for the initial match on the user's device may also be faster and less resource intensive. The matching and final selection process on the intermediate server may access more detailed information on products, service, or merchants, including potentially information that is updated in real time (such as merchant bids for referrals). This second stage of matching and selection may also utilize more computing resources available on a server or a network of servers.

One or more embodiments may provide or access a dashboard or other reporting system which enables the referring user to access information about the referral links they have sent, including but not limited to information regarding the amount of referral credit they have earned, the identity of the recipients which conducted transactions, the identity of the merchants with which transactions have occurred as a result of their referrals, and the communications platforms through which the referrals were sent.

One or more embodiments may present a referrer profile page which may be public facing and which may display brand, product and service referrals with referral links. In one or more embodiments, this enables a more graphical interface for receiving users to select referrals that generate rewards for the referrer. In one or more embodiments, a communication may be generated that includes a link to a site that allows for graphical selection of a particular merchant for example by the receiving user.

One or more embodiments may include a mechanism which enables the referring user, while on a web page, to select the URL or other indicator of such web page, and create a referral link to that page which may include an identifier of the referring user, so that the referral may be tracked, and enable the referring user to insert this referral link into a digital communication.

BRIEF DESCRIPTION OF THE DRAWINGS

The above and other aspects, features and advantages of the invention will be more apparent from the following more particular description thereof, presented in conjunction with the following drawings wherein:

FIG. 1 shows an example of a user using an embodiment of a virtual keyboard trackable referral system that accepts input from a referring user and automatically determines or otherwise infers merchants associated with products and/or services to refer based on the input, i.e., to match referrals with the input, and insert the referral into a message to a recipient that contains a trackable product or service referral.

FIG. 2 continues the example of FIG. 1, showing the recipient receiving and using the referral, and the system crediting the referrer for the successful referral.

FIG. 9 shows illustrative alternative embodiments for obtaining input that may be used to generate a referral.

FIG. 10 shows illustrative alternative embodiments for identifying potential referrals.

DETAILED DESCRIPTION OF THE INVENTION

Figure 1A:
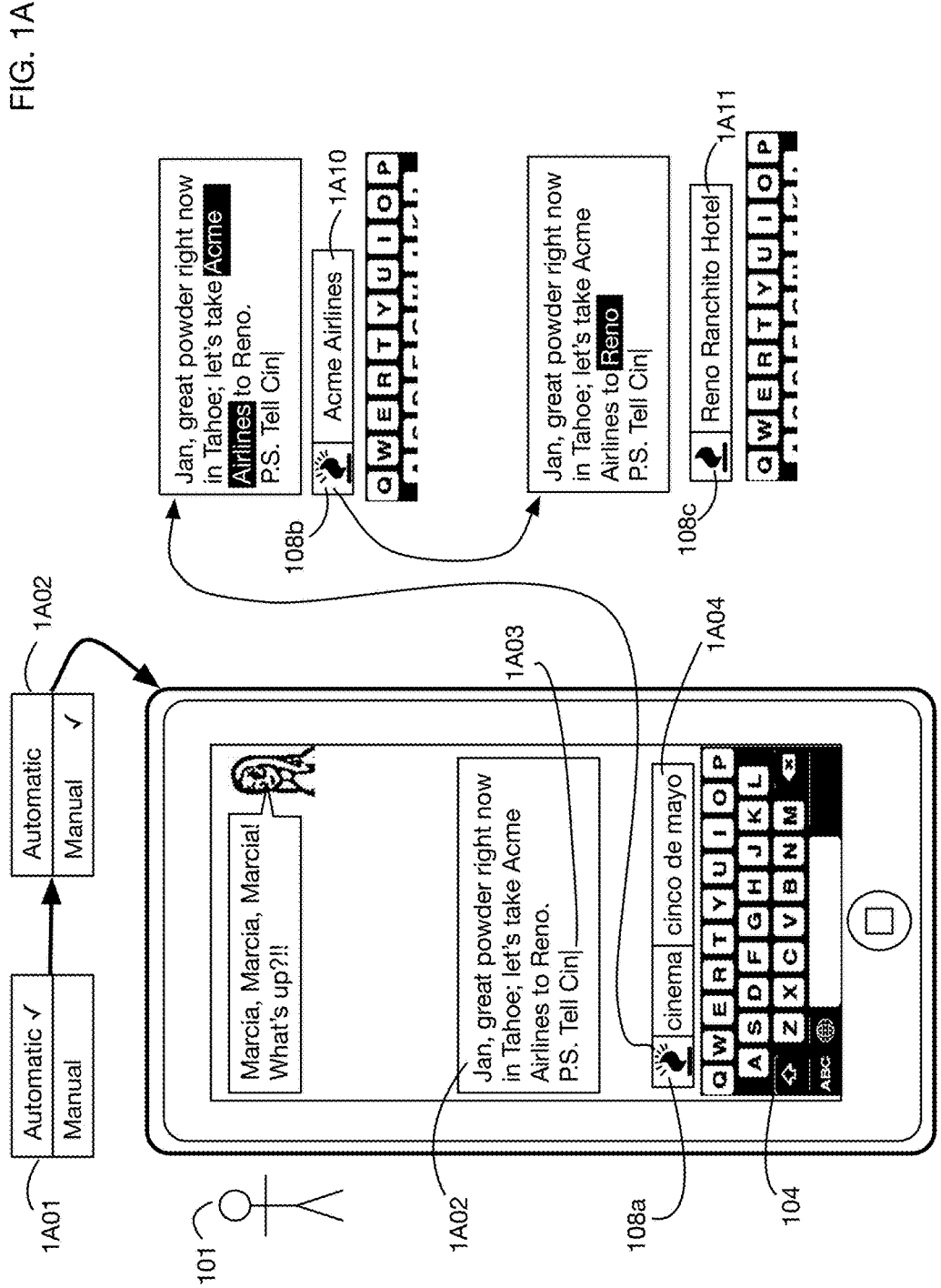
FIG. 1A shows a variation of the example of FIG. 1, where the referral matching system operates in a manual mode that requires user action before showing suggested referrals.

A virtual keyboard trackable referral system that generates trackable referrals and tracks the referrals will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

FIG. 1 shows an illustrative embodiment of the invention, illustrating the generation of a referral for example as part of a peer-to-peer communication. (FIG. 2, described below, continues this example to show how a referral is processed by the system when used by a recipient.) User 101, the referring user, uses mobile device 102 to generate a communication to one or more other users. In this example, user 101 composes a text message to user 121. One or more embodiments may integrate referrals into any type of communication and independent of the application used, including but not limited to text messages, emails, SMSs, voice messages, picture messages, video messages, chat messages, Twitter® messages, Instagram® messages, messages sent via messaging platforms including for example without limitation WhatsApp®, Snapchat® or Facebook® Messenger, and postings on any websites or services including for example, without limitation, social media sites such as Facebook®, Tumblr®, Google+®, YouTube®, Vine®, Pinterest®, Flickr®, or LinkedIn®. In one or more embodiments users may use any type or types of devices to send or receive communications and to generate, receive, or use referrals, including but not limited to a mobile device such as device 102. For example, without limitation, users may use mobile devices, cell phones, smartphones, tablets, laptop computers, notebook computers, desktop computers, server computers, smart speakers, smart watches, wearable devices, communication devices built into vehicles, smart glasses, augmented reality devices, content management systems, virtual reality devices, or networks of any of these devices. Users generating referrals may use the same devices or different devices from those used by users receiving and using referrals.

A referring user and a receiving user may each be any person, system, organization, group of persons, robot, application, business, or agency that communicate in any manner over any medium. For example, without limitation, a referring user may be an individual, a professional content creator, an editor, an author, or a business. A user may be acting on his or her own behalf, or on behalf of a business, an organization, or an agency. Recipients of a communication from a referring user may be peers, family, friends, known or unknown persons or groups, readers, business contacts, or followers of a feed or blog. Recipients may be individuals or they may be groups or audiences of any size and composition. Although the term receiving user is used in the singular in certain scenarios herein, receiving user means one or more users that receive a communication from the referring user.

In the example shown in FIG. 1, user 101 is typing a message with the cursor 105 midway through a word. The user types the message using a virtual keyboard 104 as utilized in one or more embodiments on the mobile device or electronic device 102. In this embodiment, the system, which includes virtual keyboard 104 accepts the input, here text characters and transmits the text characters to a referral matcher 110. Referral matcher 110 receives input from the virtual keyboard 104, and may suggest potential referrals based on the keystrokes received from the keyboard. The referral matcher may execute directly on the mobile device 102, or it may execute on another device (such as a server or a cloud or Internet accessible service) remote from the mobile device 102, or any combination thereof. The referral matcher 110 accesses a database of products, services, and participating merchants 111. In one or more embodiments, a computer or server that executes the specific instructions to implement the referral matcher may also host the database or in other embodiments, the database may be remote to the computer that hosts the database. In one or more embodiments, the referral matcher may access any number of data sources to identify potential referrals. These data sources may be local to the mobile device (or other device) 102, or remote from the mobile device (for example, on a server accessible via the Internet or via any other network connection). Database 111 may contain any information that may be used to locate or create a referral, or to select from or prioritize among multiple matching merchants, such as for example, without limitation, the name or names of a merchant, the name or names of a web site, the name or names of products or services, the location of merchants, reviews or ratings of products, services, or merchants, product numbers, SKU numbers, model numbers, descriptions, pictures, images, diagrams, barcodes, UPC numbers, RF codes, the amount a merchant pays for referrals, or any data derived from or related to any of this information, including any generic categories that may infer one or more merchants, for example airline or flight or fly to infer a particular merchant that provides air travel services. In the example of FIG. 1, referral matcher 110 analyzes keystrokes from virtual keyboard 104 and compares these keystrokes to the names and other information in database 111, and determines that item 107 is a potential match. In a simple example, "Acm" may be compared to any items in database 111 that being with "Acm" such as "Acme", "Acme Airlines" or that is associated with an acronym for text in the database, i.e., "ACM" that standards for "Association of Computing Machinery". In other embodiments, words such as "flight" may be associated in database 111 with all merchants that are airlines. Any schema may be utilized to provide potential matches and contain any number of associations for each merchant, product or service to compare with. It therefore provides this item as a suggested completion for the virtual keyboard input. The virtual keyboard application may also provide other suggested completions such as completion 106, which may not correspond to a referral. Suggested referrals may be identified for example using an icon such as icon 108. If the user 101 selects the suggested referral 107, which may be performed in one or more embodiments with a single tap on the suggested referral, a referral link 124 with this referral may be generated and placed into the message 123. In other embodiments, the link may be automatically inserted based on preferences or any strategy pattern employed by the system. After the user completes and sends the message, user 121 receives the message on device 122. The message 123 includes the referral link 124 generated by the referral matcher 110.

In the example shown in FIG. 1, the virtual keyboard application linked to the referral matcher 110 is used as input for a text messaging program. This same virtual keyboard application may be used universally with any other applications or services on mobile device 102, providing the same referral matching capabilities for these other applications or services without requiring altering each and every different communication application to including the trackable referral generation capability of embodiments of the invention. This flexibility illustrates a benefit of the system in providing a potentially general-purpose referral capability that may be used across multiple applications and services. For example, without limitation, the same keyboard 104 with referral icon 108 and referral matcher 110 may be used for an email application, a web browser, a chat application, a blogging application, a publishing application, a word processing application, or any other application used by user 101. In any of these applications, the referral matcher may analyze input from the keyboard and suggest potential referrals to be embedded in communications. This universal ability to generate trackable referrals regardless of the application in use in a peer-to-peer setting is unknown in the art and makes referral generation and tracking pain free and extremely easy to use for referring users.

The scenario illustrated in FIG. 1 is an example of the system working in "auto mode," where referral matches are automatically presented to the user as they are discovered by the referral matcher. One or more embodiments may also support a "manual mode," where the matcher 110 for example may work in the background but may not automatically show suggestions to the user 101. Instead, in manual mode, the keyboard or another element of the system may provide an indication or cue to indicate to the user 101 that there is a potential match. FIG. 1A illustrates an example of an embodiment operating in manual mode. User 101 configures the system to switch from automatic mode 1A01 to manual mode 1A01a. (This configuration may be performed for example using a settings screen or any other method of modifying the configuration of the referral system or the keyboard.) As the user uses virtual keyboard 104 to type input 1A02 as part of a message, the referral matcher may operate in the background to locate potential referrals related to the message, but it may not display these referral matches unless and until the user requests to see them. Text completion suggestions such as 1A04 may not contain referral suggestions initially; instead they may be simple text completions for the current word 1A03, rather than referral lookups. However, the referral matcher may provide an indication that it has located one or more matching referrals, in this example by changing the appearance of icon 108a (compared to the original icon 108 in FIG. 1). For example, without limitation, icon 108a may flash, blink, change color, change size, change shape, or otherwise change any aspect of its appearance as a notification of potential referrals. This changed icon signals to the user that potential referrals are available for review. In manual mode, the user 101 may for example single tap the icon 108*a* to indicate that the user wants to see the potential referral or referrals. In this illustrative example, the referral matcher locates two potential referrals, one for an airline and one for a hotel, by scanning and analyzing the input 1A02. A first tap on icon 108*a* shows the first potential referral 1A10 in the word completion area of the virtual keyboard. The user may for example tap on this referral 1A10 to insert it into the message 1A02. In this case, the appearance of icon 108*b* shows that there are more potential referrals. If the user taps icon 108*b* again, a second referral 1A11 is displayed. Again, the user may tap this suggestion 1A11 to insert the referral into the message 1A03. Icon 108*c* returns to its "normal" state (as in FIG. 1), indicating that there are no more potential referrals that have been located in this message text. This example is illustrative; one or more embodiments may use any type of user interface to present referral match suggestions to a user either automatically or in response to user actions. For example, a user interface may show all possible referral matches to a user simultaneously, instead of cycling through them as illustrated in FIG. 1A. One or more embodiments may also provide options for a user to select among several referrals, which may for instance correspond to different product categories. For example, the word "china" in a message may refer to the product category porcelain, or the country (which may suggest referrals related to travel); in one or more embodiments, the system may prompt the user to select between these options (although in some cases, embodiments of the system automatically determine the appropriate product category by analyzing the message context or historical data regarding the user's inputs).

FIG. 2 continues the example of FIG. 1. User 121 first receives message 123 containing referral link 124, as described above. The referral link may for example contain a link to a website or site or an e-commerce site corresponding to the referred merchant, product, or service. One or more embodiments may use any type or types of links, including for example, without limitation, a hyperlink, a URL, an image, a video, or a short code. In the example shown in FIG. 2 the link is a hyperlink for illustration. In one or more embodiments, this hyperlink may link to an intermediate web site or server, for example, which may be used for tracking or accounting, and which may then forward the user to the appropriate e-commerce site. In the example of FIG. 2, receiving user 121 selects referral link 124, which takes the user to the website 202 (or to a similar service or application). The referral link 124 includes URL 201 that has the address of the e-commerce site (or to another server that then forwards to this e-commerce site), along with a parameter that identifies the referring user. This URL format is illustrative; one or more embodiments may embed any desired information into a referral link in any desired format. User 121 may then interact with site 202 to purchase goods or services or perform other transactions. When the user completes a transaction, for example using button 203, referral tracker 210 receives this information and credits the referring user with the successful referral. In one or more embodiments, information relating to completed transactions may be obtained from one or more third parties, including for example the merchant, an affiliate network, a credit card processor, or other system. For example, the website 202 may transmit a message to a referral tracker server with the URL 201 (so that the original referrer can be identified); this message may also include any additional details of the transaction. The referral tracker 210 may determine the amount and type of referral credit 211, based for example on the amount of the transaction and on specific arrangements with the e-commerce merchant for referrals. The referral tracker may then collect this credit from the referring merchant 212, and transmit this credit to the original referring user 101 (possibly net of a fee to the referral system provider). In one or more embodiments, the computer or server that executes referral matcher 110 may also execute or otherwise host referral tracker 210. In other embodiments, a distributed architecture may be utilized and multiple computers may implement the referral matcher 110 and referral tracker 210. Any cookie based technique or any other technique may be utilized to provide referral tracking so that for example a receiving user may use a link or otherwise purchase a product or service at a later date and still be tracked as taking an action because of the referral, so that the referral tracker may credit the referring user.

In one or more embodiments, any or all of the functions of the referral tracker 210 may be provided by third-party systems or services. For example, without limitation, these third-party systems or services may provide some or all aspects of tracking, attribution, payment processing, calculation of referral credits earned, or reconciliation.

One or more embodiments may provide a referral credit for any type of action or event that results from a referral, including but not limited to a purchase transaction as shown in FIG. 2. For example, without limitation, a referral credit may be provided for a completed transaction by a recipient, for a recipient clicking on a link, or for a recipient taking an action after clicking on a link, such as signing up for or joining a program or service, requesting information, or installing or downloading an application.

Figure 3:
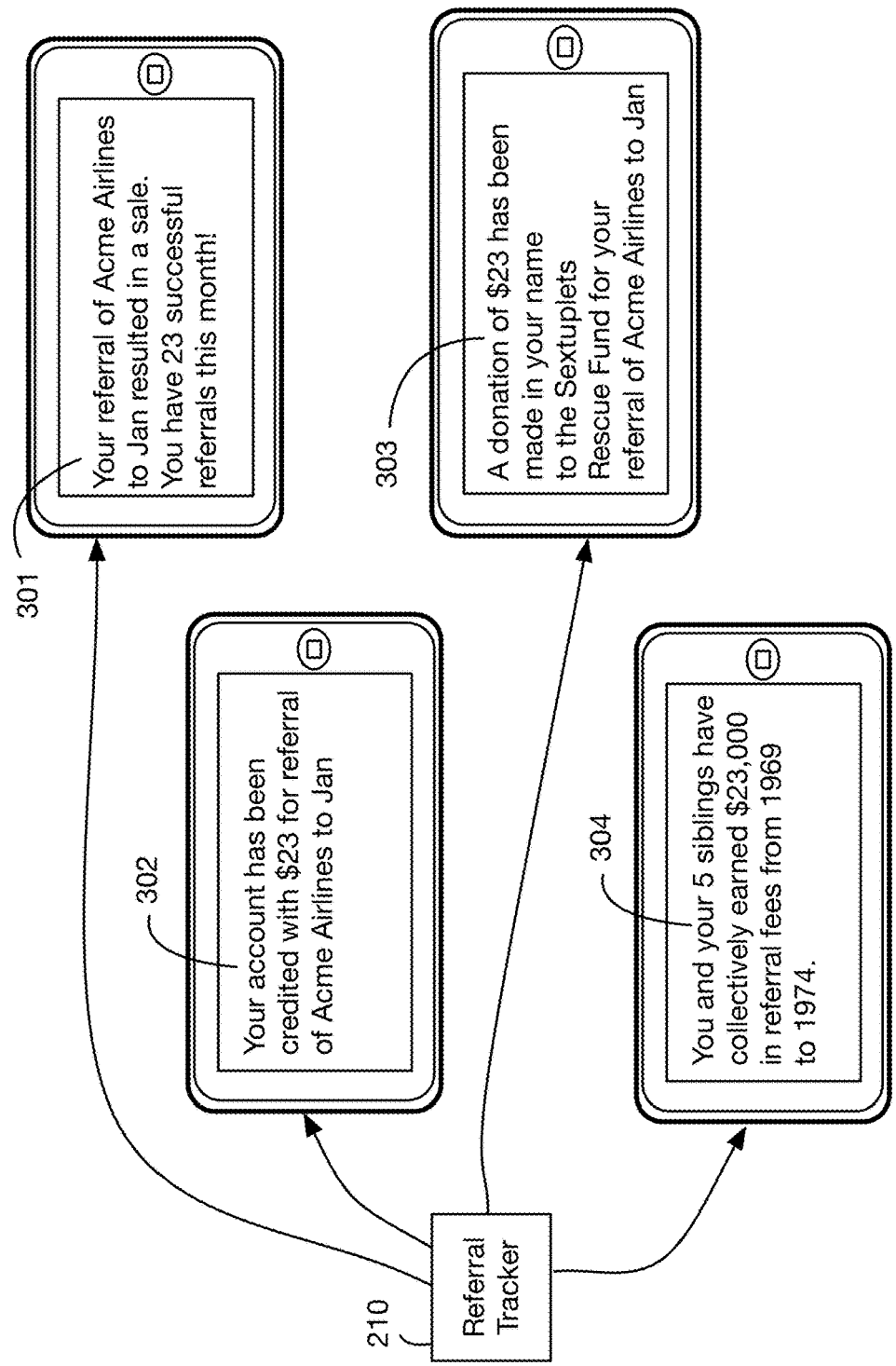
FIG. 3 shows illustrative options of the types of credits and notifications the referral system may provide to the referrer.

In one or more embodiments, a referral credit may be provided to any person, persons, groups, or organizations, including but not limited to the original referrer. A referral credit may be monetary, or it may take any other form such as an award, a gift of goods or services, a credit against previous expenditures, or a credit for future expenditures or usage. FIG. 3 illustrates several options for referral credits; these options are illustrative and are not limiting. Referral tracker 210 may issue a monetary credit 302 to the original referrer. It may generate a feedback message 301 to the referrer, which may for example inform the referrer when a referral has been used by a recipient; feedback messages may also provide the referrer with aggregate information on all activity resulting from the referrer's referrals. One or more embodiments may also provide an account profile or account summary view accessible to the referring user, where the user may view information such as details of referrals, resulting clicks, transaction, credits, payments, products, services, or merchants referred, conversion rates for referrals, analysis and suggestions which aid in optimizing future referrals, and preference settings. Referral tracker 210 may generate a referral credit 303 in the form of a donation to an organization, for example which may or may not be made in the name of the referrer or may otherwise be associated with the referrer. In one or more embodiments referrals may be tracked on a group basis; for example, referral tracker 210 may generate aggregate referral credits 304 to a group (or on behalf of a group) based on activity resulting from referrals by any or all members of the group. In one or more embodiments, a referral credit may also be shared between a referring user and the receiving user (such as referring user 101 and receiving user 121 in FIG. 1.)

Figure 4:
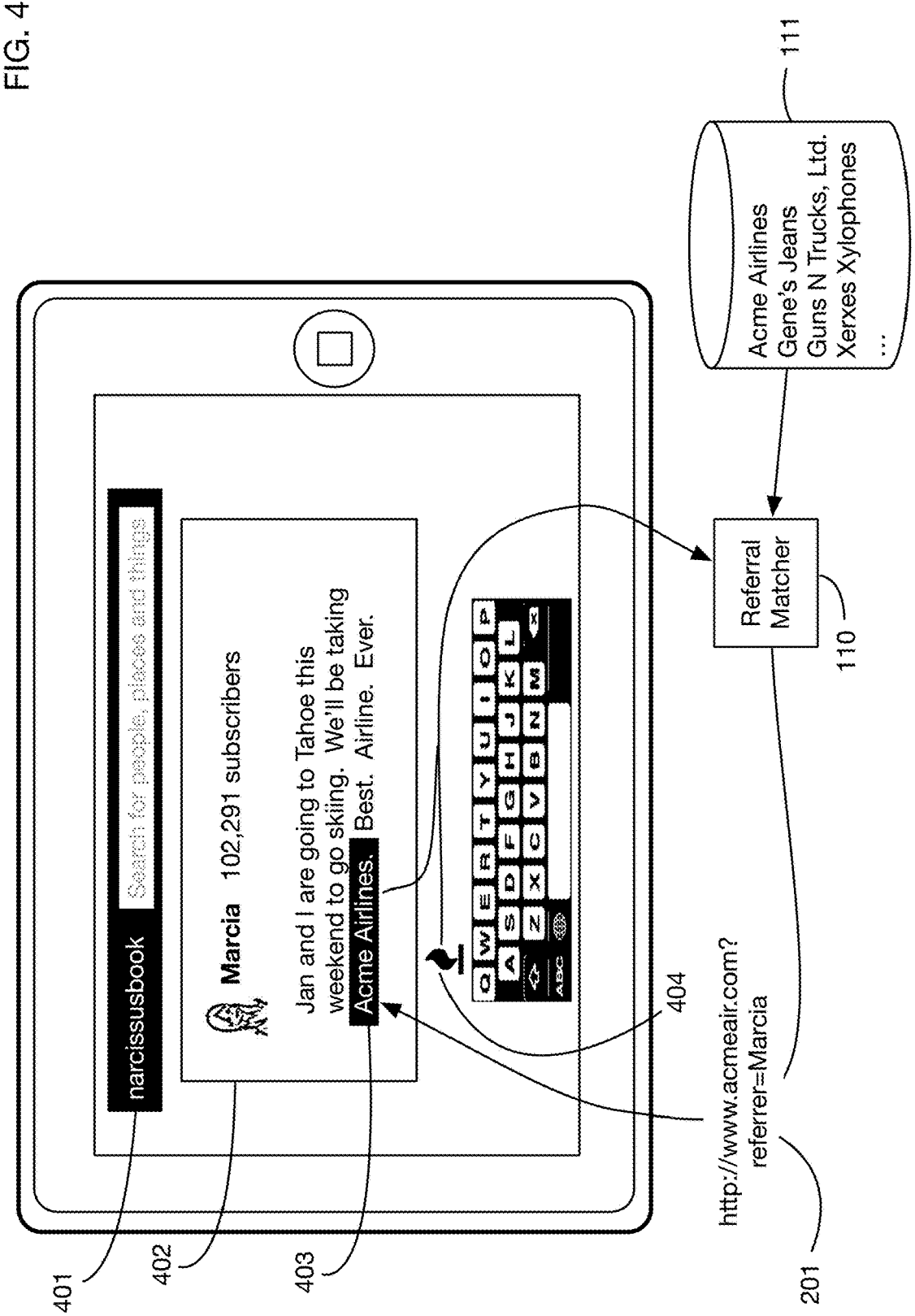
FIG. 4 illustrates an embodiment that allows a user to select text in a social media posting, and search for referrals matching the selected text.

FIG. 4 illustrates an embodiment that allows a user to select text or other items and to initiate a search for potentially matching products, services, or merchants for referrals. In this example, the user is communicating via a posting 402 on a social media site 401. Any other user who reads the posting may receive this communication, and may thereby receive and use referrals embedded in the posting. The user types the posting and selects text 403, and then initiates a search for matching referrals by pressing icon 404, which may for example be integrated into a virtual keyboard or otherwise made available to the application used for creating or reviewing the posting. The referral matcher 110 matches the selected text 403 to the merchant database 111, and generates a referral link 201 that is inserted into the posting 402. The display name of the referral link may remain the same, such as remaining the selected text 403; one or more embodiments may modify the display name of the referral link in any desired manner, for example as necessary to comply with policies or technical requirements of the communications channel being used. In one or more embodiments, a user may be able to select and match any information, including for example, without limitation, text, documents, files, web pages, URLs, images, or message threads, and may be able to initiate a search by the referral matcher against any of this information.

In one or more embodiments, the referral matcher may perform a search for matches continuously in the background, and it may display the results of these background searches when the user explicitly indicates that he or she wants to see the matches. For example, the user may tap an icon such as icon 404 in FIG. 4 in order to see matching referrals. Referral matches may be determined based on user selected text (as shown in FIG. 4), or based on automatically detected relevant content (as shown in FIG. 1), or on any combination thereof. In an "auto mode," matching referrals may be shown to the user automatically as they are located, as shown in FIG. 1. In a "manual mode," matching referrals may be shown on request. In one or more embodiments, a user may be able to view multiple matching referrals on request, for example by successively tapping on an icon to see the next match in the list. As an illustration, for message 402 in FIG. 4, if the system is in manual mode, a first tap on icon 404 may present a suggestion of Acme Airlines, while a second tap on icon 404 may present a suggestion of a hotel in Tahoe.

Figure 5:
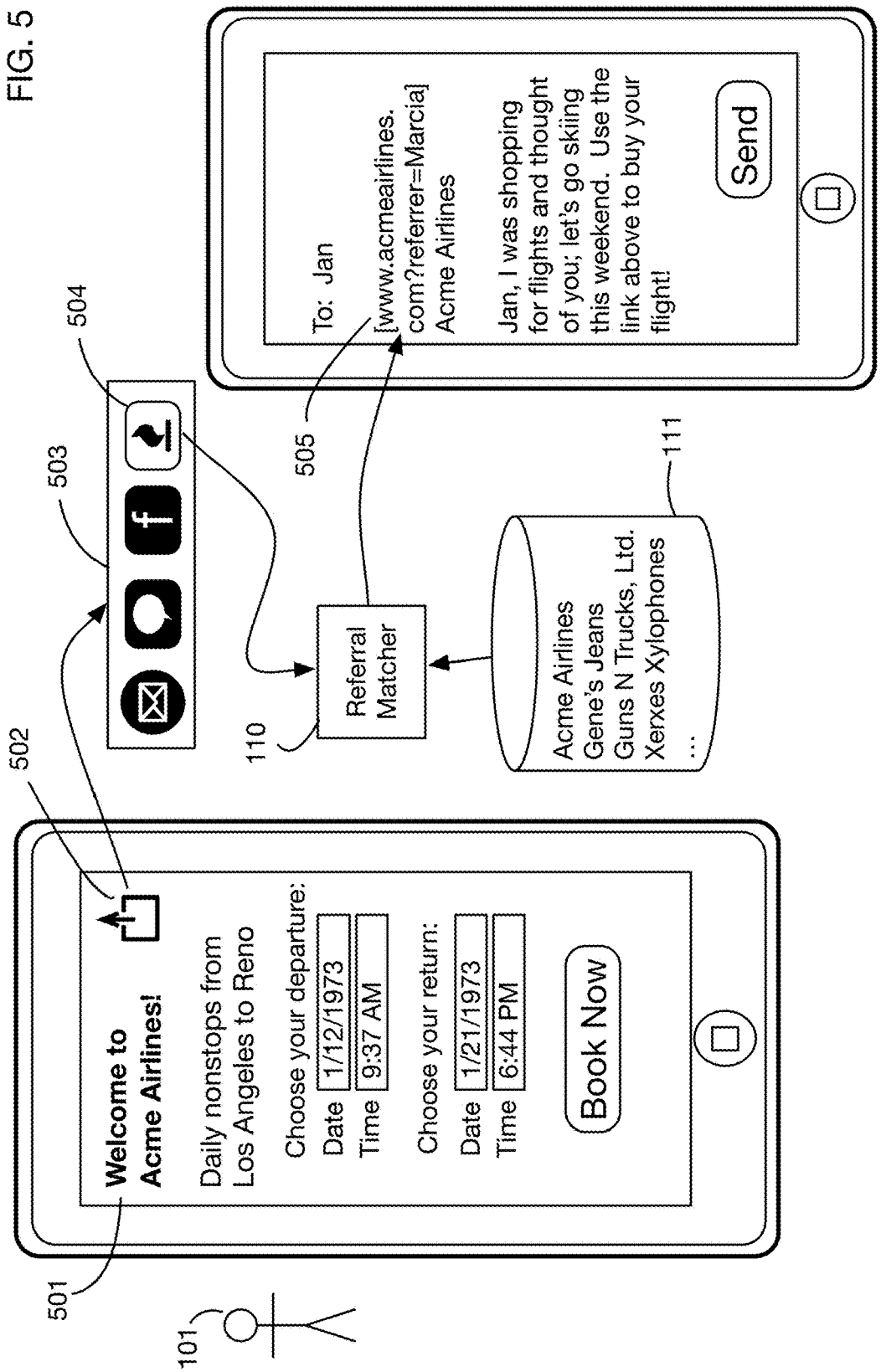
FIG. 5 illustrates an embodiment that generates a referral using a share button.

FIG. 5 illustrates an embodiment that allows a user to generate a referral link using a share button or a similar sharing capability. User 101 is browsing website 501, for example while making or planning a purchase. The user decides to share the website, and possibly also share specifics of the user's browsing (such as potential purchases), by pressing the share button 502. This share button may for example present a sharing menu 503 to the user, which offers multiple ways to share the current context. In one or more embodiments, the system may provide a referral sharing option 504 as an option in this sharing menu. When the user presses the referral button 504, the referral matcher 110 may examine the current context that is being shared, and may determine whether any items from database 111 match this context. If a match is found, it may for example be inserted as a referral link 505 into a message, which the user may then complete and send to any desired recipient or recipients. In one or more embodiments, matching of the context to potential referrals and generation of referral links may be combined with sharing via any other method, such as via a text, email, messaging app, or a social media site.

In one or more embodiments, sharing of a website URL or other information may be done first via a sharing button, and then the option to convert this link to a referral link may be presented in the messaging application that shares the link. For example, if user 101 selects the email icon from sharing menu 503, an email application may appear allowing the user to compose a message with the link to site 501. In this email application, the user may have an option to convert this website link to a referral link, for example by pressing a referral icon such as icon 504 that may appear in the email application, or, in the event that the application launches a virtual keyboard, by pressing a keyboard icon.

In one or more embodiments, sharing of a referral related to a website may be performed directly using a button or icon that generates a referral link to that website, or to a similar site related to the website. For example, without limitation, any website may incorporate a "refer" button or icon. When a user presses or otherwise accesses this button or icon, a referral link may be created for a merchant related to the website, where the referral link also identifies the user making the referral. This referral button or icon may be analogous for example to a Pinterest™ pin button, but instead of "pinning" a link to the website, the referral button or icon generates a referral link to the web site that will generate a referral credit to the referring user when and if another user accesses the referral link and completes a transaction.

Figure 6:
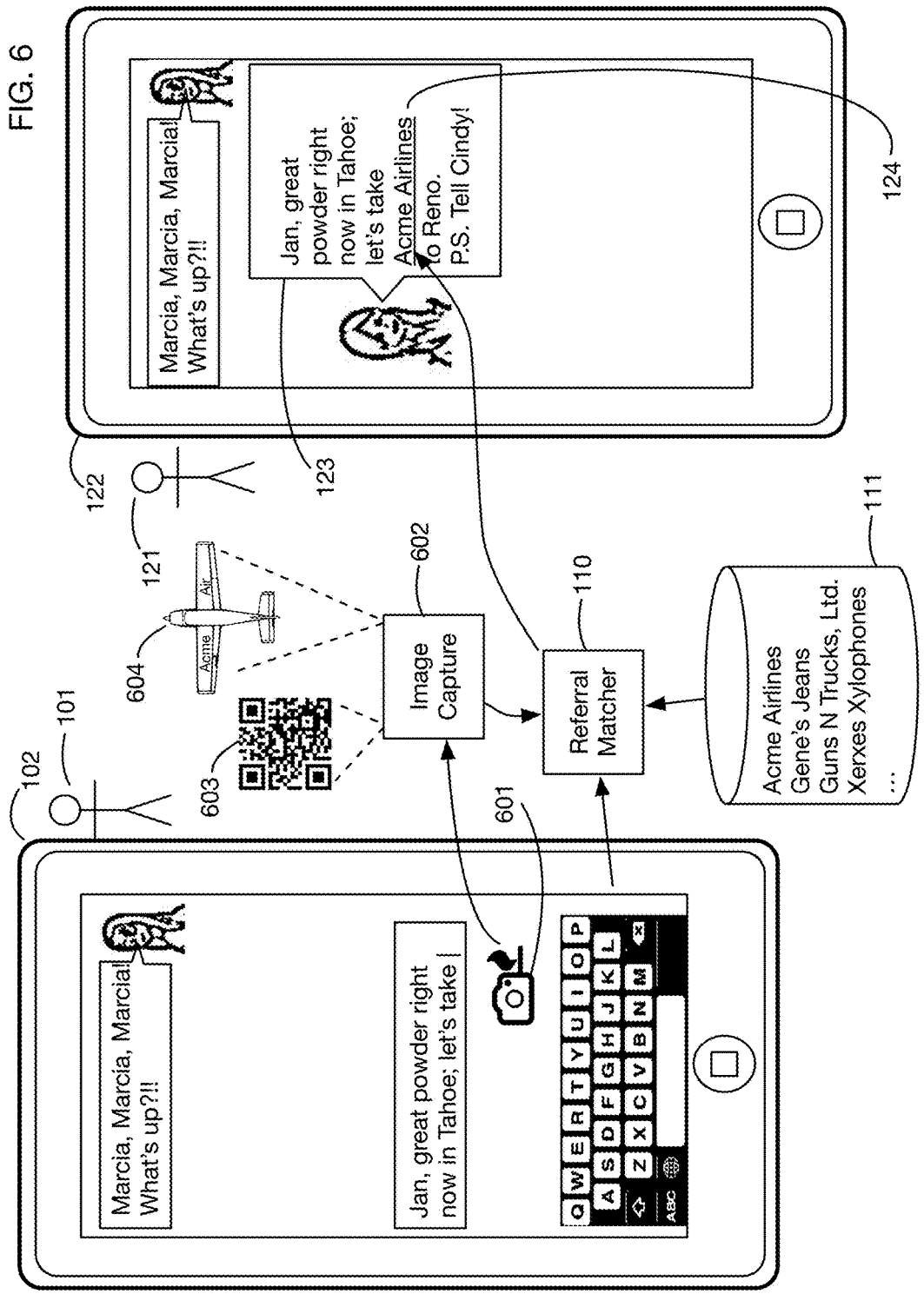
FIG. 6 illustrates an embodiment that matches an image captured by a camera (such as a barcode or an image of a product) and that generates a referral based on this image.

FIG. 6 illustrates an embodiment that supports input of an image into a referral matching process. The system may match any image or any data derived from an image with the items in a merchant database to obtain potential referrals that match the image. The image may be for example, without limitation, a barcode (either a 1D barcode or a 2D barcode such as a QR code), an image containing a product name or product identifier, a picture of a product, or one or more frames from a video containing a product. In the example shown in FIG. 6, user 101 uses mobile device 102 to compose a message to a recipient. The user wants to insert a referral link to a product, and therefore presses image capture button 601 to initiate image capture 602, for example via a camera integrated into device 102 or accessible via device 102. This image may be for example, without limitation, a QR code 603 that identifies the product, service, or merchant being referred, or a picture 604 of the product, service, or merchant. The image capture 602 provides the captured image or images to the referral matcher 110, which compares the captured image or images to information in the merchant database 111. Comparison and matching of images may in one or more embodiments use external databases or services, such as for example a lookup service for barcodes or an external database of product images. If a match is located, the referral matcher may generate a referral link 124 and insert this link into the message 123 transmitted to the message recipient 121. In one or more embodiments, a barcode or QR code application may execute on electronic device 102 and the information obtained from the barcode or QR code may be utilized to index into database 111 to determine a corresponding merchant. In other embodiments, any image processing based application that can recognize objects may be utilized to determine a product or product category that is utilized to search database 111 for.

In one or more embodiments of the invention, any type of input may be provided to the referral matcher, including but not limited to text input and image input. For example, without limitation, input into the referral matcher may include sounds of any type or voice commands, and the referral matcher may for example use voice recognition or any type of audio processing to recognize the input and compare it to items in the merchant database. Input may also include data captured by any type of sensor, scanner, or reader. For example, one or more embodiments may allow a user to use an RFID reader to read an RFID tag that identifies a potential referral.

Figure 7:
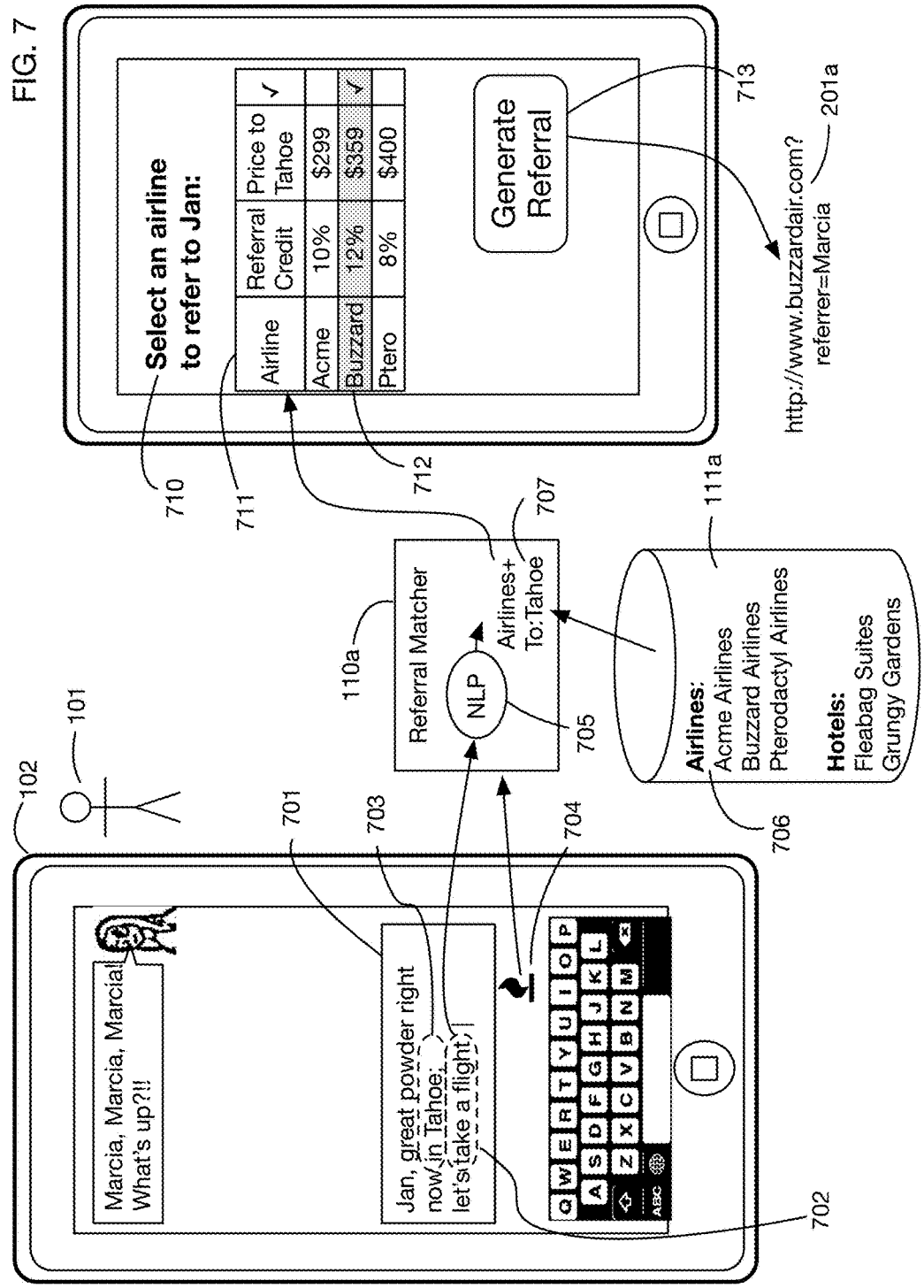
FIG. 7 illustrates an embodiment that uses natural language processing to identify words in a communication that may infer or otherwise match one or more merchants, and that presents a choice of matching merchants to the user.

In one or more embodiments, the referral matcher may use language processing and analysis techniques to understand the user's input and to determine matching merchants. These techniques may include for example, without limitation, artificial intelligence, natural language processing, collaborative filtering, type-ahead, predictive analytics, machine learning, recommendation engine, personalization engine, or any combinations thereof. FIG. 7 illustrates an embodiment where the referral matcher 110a has a natural language processor (NLP) 705 integrated into or accessible to the referral matcher. The user's input 701 is provided to the natural language processor 705, either automatically as the user types or in response to the user pressing a referral button such as 704. In this illustrative example, the NLP subsystem 705 recognizes the phrase 702 as relating to airline travel, and therefore searches the merchant database 111a for airlines. FIG. 7 also illustrates that in one or more embodiments the merchant database may be categorized, indexed, or organized in any desired manner to facilitate referral matching; for example, database 111a has airline merchants 706 identified as a particular product group. In this example, the natural language processor also detects that phrase 703 in the user's input 701 indicates the user's likely destination for air travel. Therefore, the NLP subsystem 705 determines that the user is discussing context 707, which includes both the product category (airlines) and the likely destination. All contextual information from analysis of the user's input may be used to select one or more matching referrals. Virtual keyboard 104 may be utilized with the microphone instead of directly manually typing as per FIG. 1 and also FIG. 7 for example.

Continuing the example shown in FIG. 7, in this case the referral matcher 110a determines that there are multiple possible merchants that match the user's input. When multiple merchants match the input, the system may either automatically make a selection of a merchant to refer, or it may ask the user to make a selection. (One or more embodiments may use combinations of these methods.) FIG. 7 illustrates an embodiment that asks the user to select which merchant to refer. Once the referral matcher has determined matching merchants, the system presents screen 710 to the user and asks the user to select one of the matching merchants. (This screen 710 is illustrative; one or more embodiments may present matching options to a user in any desired format and sequence.) In one or more embodiments, the referral matcher may provide additional information to assist in making the selection. For example, in FIG. 7 the selection screen 710 contains table 711 that shows the matching merchants along with the referral credits offered by each merchant. Table 711 also shows the price from each merchant for travel to the destination 707 determined by NLP subsystem 705. This example illustrates how the complete context 707 determined by the NLP subsystem may be used to determine an appropriate or potential referral, or to assist the user in making a selection from multiple matches. The user may select a particular merchant from table 711 and generate a referral link 201a using button 713. Other user interface options may include for example tapping a selected merchant in the table to generate a referral to that merchant, or tapping a button or icon to prompt the matcher to prompt the matcher to display a list of alternate matching merchants, or in some cases alternative product categories when the input has matches in multiple categories (such as a book title that has also been made into a movie and a board game).

Although FIG. 7 illustrates an example where the user makes a selection of a referral, in one or more embodiments the system may automatically select a referral based for example on the referral credit, the price of the product or service offered, or on any other factors. One or more embodiments may include a bidding system whereby merchants bid for referrals, for example by offering referral credit rates or other rewards. In one or more embodiments, the bidding system may be dynamic, in that referral credit information may be obtained for each transaction, for example whenever a referral matcher or a user is making a selection among merchants to generate a referral.

One or more embodiments may include a merchant bidding system through which participating merchants may compete with other participating merchants to be positioned higher in the prioritization of referrals. A merchant may include, without limitation, a retailer, e-commerce provider, service provider, advertiser, aggregator, broker, agency, promoter, or a party acting on their own behalf or on behalf of another party. Any of the following techniques may be utilized. Embodiments of the system may provide merchants with a self-service system for placing bids. Merchants may bid on a variety of matching characteristics including, without limitation, brand, product, service, keyword, phrase, product category, SKU or other product coding. Merchants may bid based on bidding strategies including, without limitation, referral fee percentage, fixed amount of reward, bounty for leads, price per click, bounty for installation of application or software, or another action performed by a recipient who has utilized a referral link to the merchant. Embodiments of the system may include a bidding platform that may provide the merchant with multiple modes of bidding including, without limitation, manual mode (with which, for example, merchant sets a specific bid price for a specific product referral) or automatic mode (with which, for example, merchant designates a daily budget and time period and the system adjusts the referral fee bid automatically to deliver the most referrals possible within the merchant's designated budget and time period). The merchant may specify bid pricing or referral limits based upon specific characteristics of the sender or recipient(s) including, without limitation, the sender or recipient's geography or, demographics, sender or recipient transaction history, input type used by sender, device type used by sender or recipient, communication channel through which the referral link was sent, or any combination thereof. The merchant may set limits on bids placed and may set time period for which the limits apply. Limits may include (without limitation) maximum amount of referral credits paid (for example a daily budget), maximum number of referrals received or other limits. Embodiments of the system may enable the merchant to set dynamically priced bids, such that the bid amount adjusts, which may be automatic, depending upon factors such as, without limitation, time of day, level of demand, inventory availability, climate changes, competitive pricing dynamics relating to other merchants, specificity or other characteristic of the sender's input which generated the referral, number or rate of referrals already received or paid by the merchant, or other characteristics of sender or recipient such as any of those mentioned above (e.g., geography, user demographics, communication channel utilized, etc.). Embodiments of the system may provide merchants with a dashboard which may provide, without limitation, account settings, preference settings, payment setting, reporting, data and analysis, bidding controls, account management services and communication tools. Embodiments of the system may implement any of these techniques for example at least at FIG. 11, step 1112.

Figure 8:
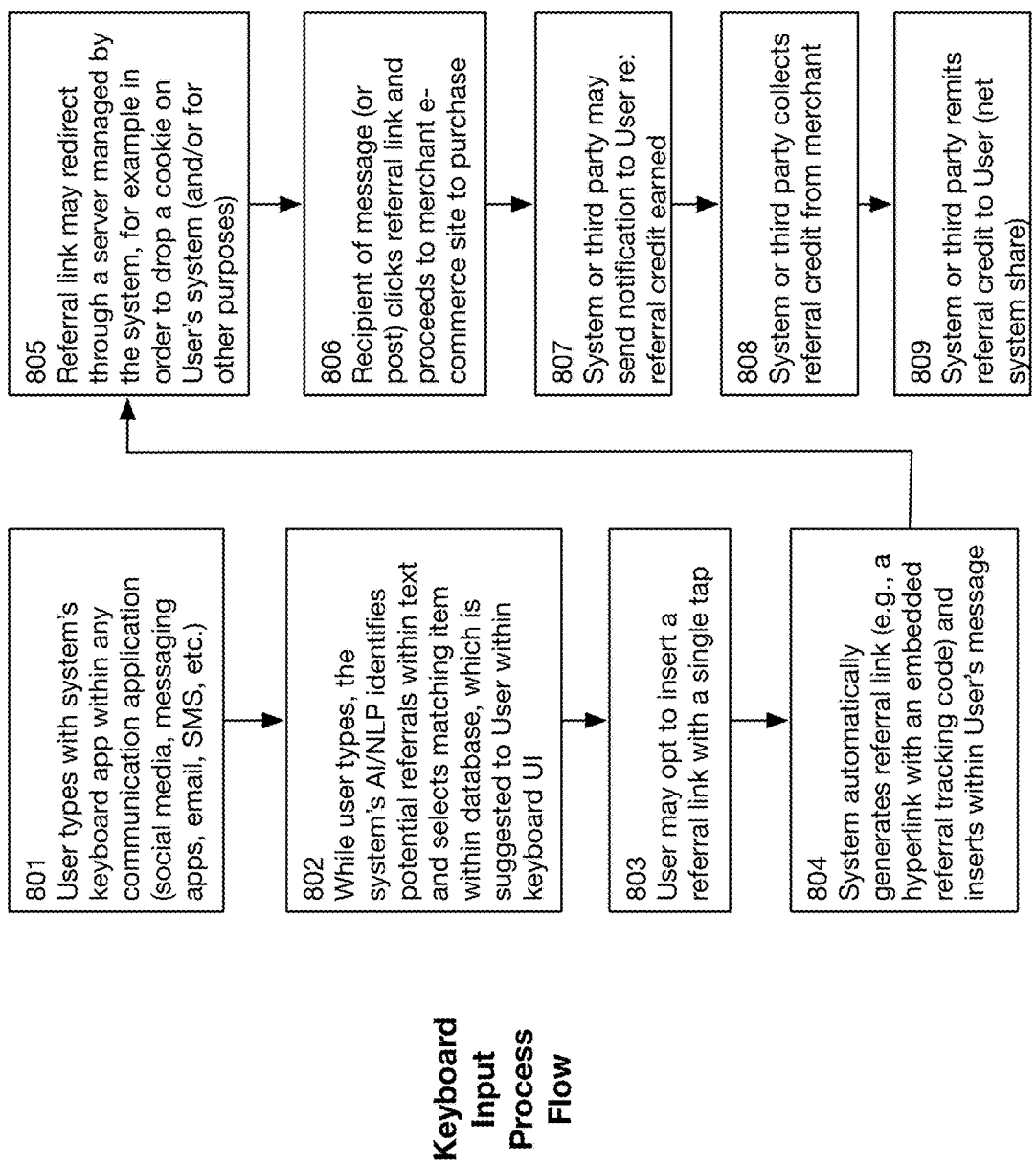
FIG. 8 shows an illustrative process flow for an embodiment of a peer-to-peer trackable referral system, where the input used for the referral lookup is obtained from a keyboard.

FIG. 8 shows an illustrative process flow for selected steps in the referral process, for a scenario and embodiment in which input is obtained from the user via a keyboard. These steps are illustrative; one or more embodiments may execute different steps, additional steps, or may execute any of the steps shown in FIG. 8 in a different order or in parallel. In step 801, the system accepts input as the user provides the input via keystrokes using a virtual keyboard connected to a communications app. In one or more embodiments, the virtual keyboard may contain or be linked to a referral matcher for example over any type of local or remote communications channel; this referral-aware keyboard may for example be usable with any application that accepts keyboard input, (which again include spoken words via the microphone). By integrating the referral matcher with the keyboard, one or more embodiments enables universal general-purpose referral generation capability for any communication initiated by the user.

In step 802, the referral matcher may use artificial intelligence, natural language processing, or similar techniques to parse and understand the user's input. It may then select a matching item in the database, and suggest this referral to the user. A matching item may be any type of information for which a referral or recommendation may be relevant, including for example, without limitation, a product, a service, a brand, a merchant, an activity, an instruction, a suggestion, a solution, an information source, a person, and organization, a professional, or any combination thereof. The suggestion may be integrated into the keyboard app, for example as a suggested word completion. At step 803, the system may accept input from the user that may then tap on the suggested referral to accept it, which triggers step 804 that creates and inserts a referral link into the communication. The referral link may for example contain a hyperlink to a merchant (or to an intermediary), along with a tracking code that identifies the referring user.

Once the message containing the referral link is transmitted to the recipient, the system may execute additional steps such as steps 805 through 809, for example when and if the recipient uses the referral link to access a merchant site or to make a purchase. In step 805, if the recipient access the referral link, the link may in one or more embodiments initially pass through an intermediate server, prior to redirecting the recipient to the merchant's site. This server may for example track the referral, and it may place tracking information such as cookies on the recipient's device. A cookie may for example have a duration that last for multiple days, thereby providing credit to the referrer if the recipient transacts at another time other than the initial click of the link. The cookie may also provide credit if the recipient subsequently goes directly to the merchant site without using the referral link. In cases where the recipient's device does not accept cookies (many mobile phones do not), one or more embodiments may use other techniques such as device UID and IP address to associate a recipient's subsequent transactions with the original referral link. In one or more embodiments, the referral link may lead the recipient to a site or user interface control that may link to one or more merchants, rather than to an intermediate server that automatically forwards to a merchant site. For example, without limitation, the referral link may lead the recipient to a jump page, an interstitial web page, a pop-up, or an overlay. This link destination may show a range of information related to the referral link, including for example product descriptions, product or merchant locations, a list of matching merchants from which the recipient can select, images, videos, or any other information related to the referral.

In step 806, the system accepts input from the recipient who proceeds to the merchant's site using the referral link. If the recipient makes a purchase or other transaction on this site, the system's referral tracker records the transaction. In step 807, a notification may be sent to the referring user by the system. In step 808, the referral tracker collects a referral credit from the merchant, which is then remitted in step 809 to the referring user. In one or more embodiments, some or all of the steps of tracking, attribution, collection, and payment may be performed by third-party services or systems.

Figure 8A:
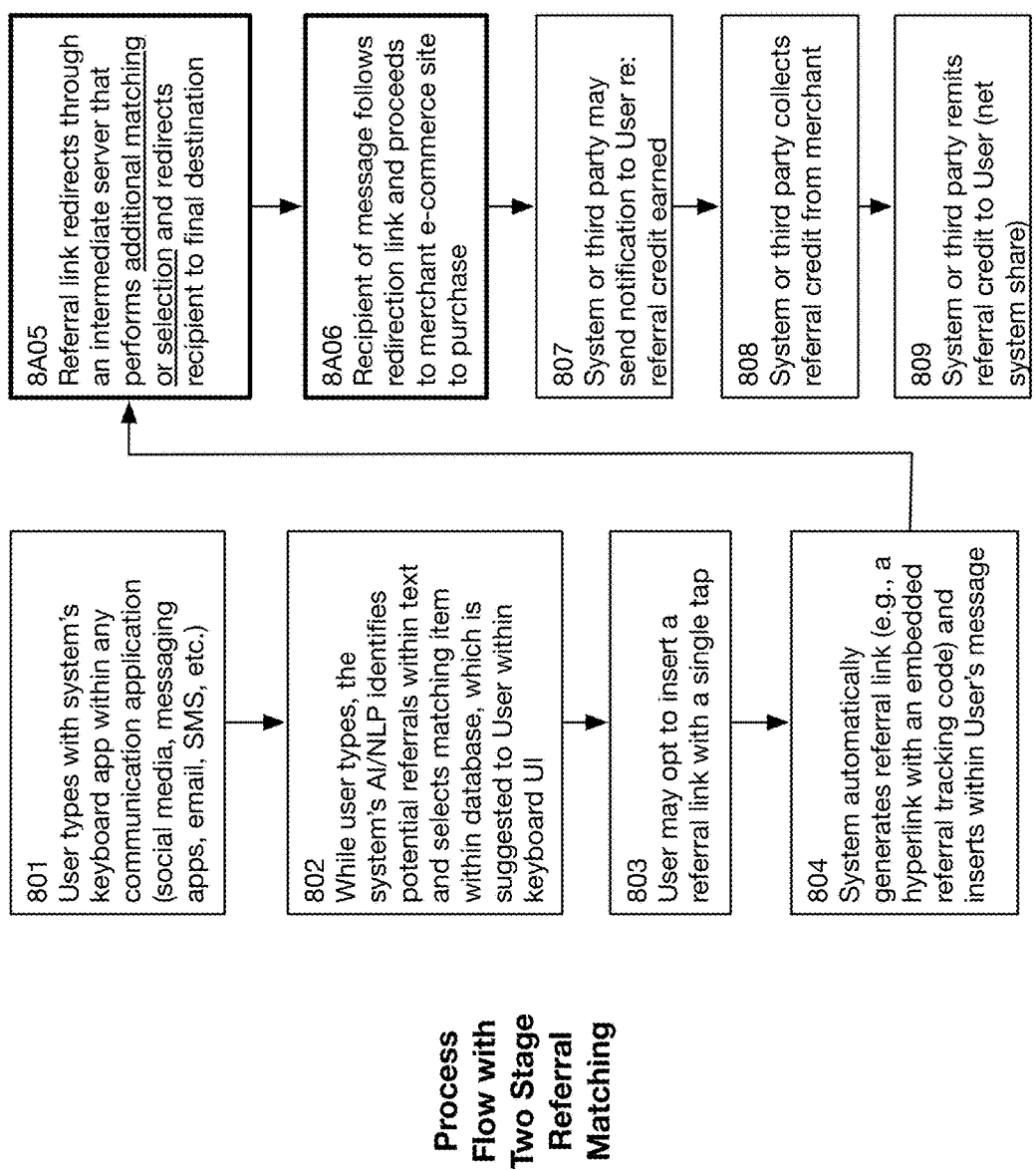
FIG. 8A shows a variation of the process flow of FIG. 8, where a referral link directs a recipient to an intermediate server that makes a final selection of a referral destination, and redirects the recipient to that destination.

In one or more embodiments, determining a destination (such as an e-commerce site or a product page) for a referral may be performed in two (or more) stages. FIG. 8A shows an illustrative process flow for an embodiment that uses two-stage matching to direct a recipient to a referral destination. Initially in step 802, as in FIG. 8, the referral matcher determines a match for the user's input, and in step 804 the system generates a link with the match information. However, in one or more embodiments the initial match in step 802 may not identify a final referral destination, but may instead identify only general information such as the existence of a matching product, service, or merchant, or a general category or group of products, services, or merchants that may match the user's input. For example, the initial referral matching step may identify that a user communication mentions a flight, but it may not identify a particular airline to fulfill this flight. In these situations, the initial referral link generated in step 804 may direct the recipient to an intermediate server that performs additional processing and matching in step 8A05 to select a final destination for the referral; the intermediate server may then redirect the recipient of the referral link to this final destination. When the recipient is redirected, the recipient arrives in step 8A06 at a final referral destination (such as an e-commerce site), where the recipient can perform actions that result in a referral credit to the referring user (as described above with respect to FIG. 8). The final destination may be for example, without limitation, a web site, web page, application, URL, URI, web service, or more generally any physical or virtual destination or service that completes the referral.

A potential benefit of the process flow illustrated in FIG. 8A is that the initial referral matching step 802 can be relatively "lightweight" and may for example require only a relatively small database of products, services, and merchants. Moreover, this database for the initial matching may not need to be updated in real time to reflect dynamic information that may determine the best match for a referral. Because the final matching stage 8A05 is performed on the intermediate server, it can access a more complete and up-to-date database of information, including for example dynamically updated bids from merchants on referrals. It may also access more powerful computing resources to execute computationally intensive algorithms. The intermediate server can use any desired strategy or prioritization algorithms to determine which merchant to send a recipient to. For example, without limitation, the intermediate server may rank merchants by any or all of price, availability, user ratings or reviews, level of inventory, proximity to a user, speed of fulfillment, or size of referral credit offered to the referring user.

FIG. 8A illustrates a two-stage referral matching process flow. One or more embodiments may generalize this process to perform referral matching in any desired number of stages, using any desired number of servers and databases to process information and determine a final destination associated with a referral link.

The process flow shown in FIG. 8 uses keyboard input as illustrative input into the referral process. As described above, other forms of input may be accepted by one or more embodiments. FIG. 9 illustrates several other input method options that may be supported by one or more embodiments of the referral system. In addition to keyboard input option 901 (as shown in FIG. 8), input may be obtained from a camera scanning any type of code, e.g., barcode 902, from a share button option 903, from a user selection of text or a URL 904, from a button 905 that grabs a current URL, from a camera scanning a product image 906, from images or audio obtained from Google™ glasses 907, from a link or button placed on any website 908, from add-ons or extensions for other keyboards 909, from an application that integrates with a physical keyboard 910, from voice input 911, or from type ahead, predictive word suggestions, or glide typing applications 912. These input methods are illustrative; one or more embodiments may obtain input of any type, in any format, from any device, service, subsystem, or application.

FIG. 10 shows illustrative options for keyword matching or similar functionality that may be used to identify potential referrals within the user's text input or other input. Matching options may include for example artificial intelligence 1001, natural language processing 1002, type-ahead 1003, spell-checking 1004, prompts for text when the user presses a referral button or icon 1005, predictive typing 1006, personalization based on past typing or preferences 1007, and processing using a recommendation engine 1008. Additional options may include for example, without limitation, collaborative filtering, affect analysis, predictive analytics, and machine learning.

Figure 11:
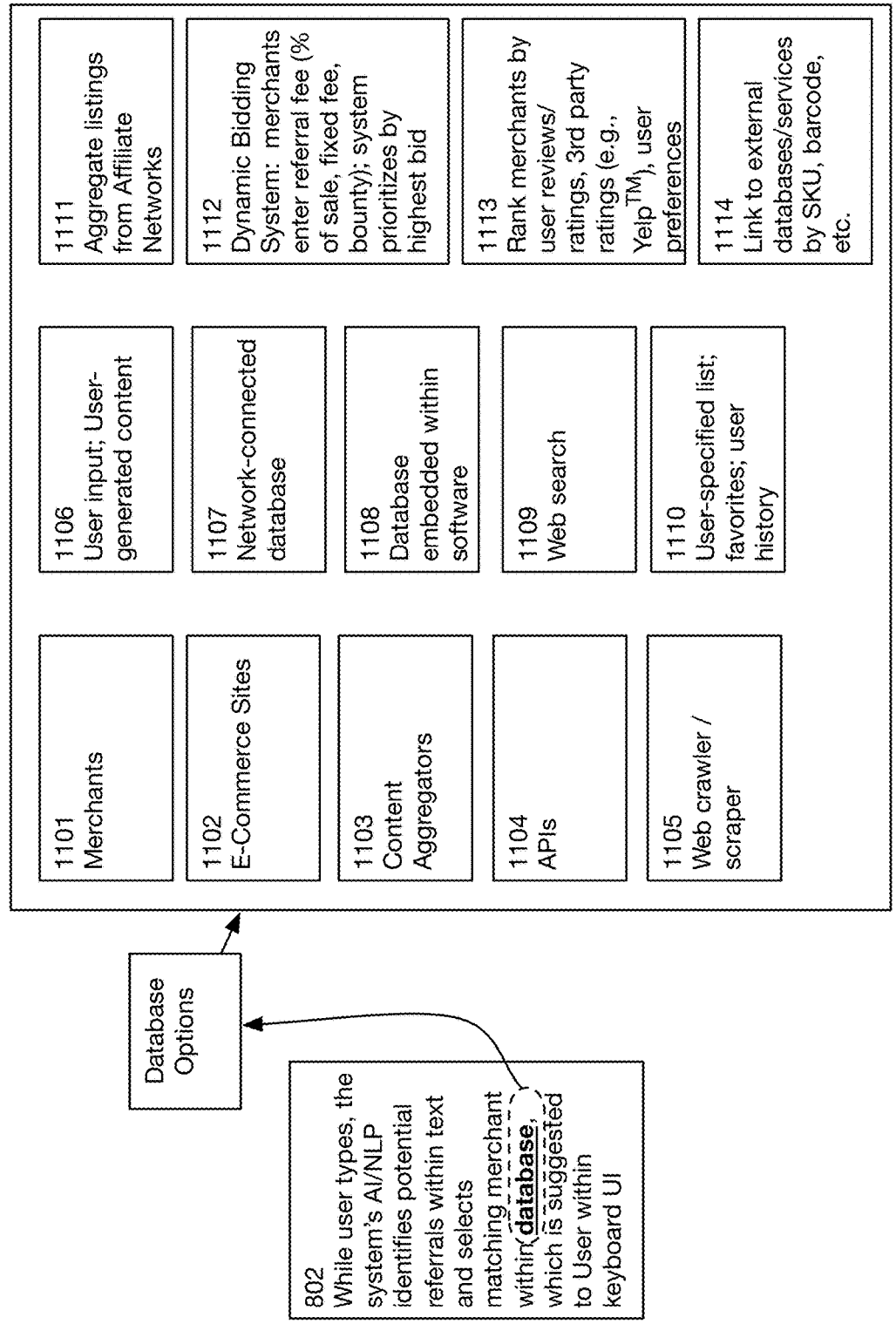
FIG. 11 shows illustrative alternative embodiments for information sources that may be used for a database of merchants for potential referrals.

FIG. 11 shows illustrative options for data sources that may provide data for a merchant database. A merchant database may contain information on merchants and on any products or services offered by merchants or by any sellers. Data may be obtained directly from merchants 1101 and e-commerce sites 1102, or indirectly from content aggregators 1103. Data may be obtained via APIs 1104 or by using web crawlers/scrapers 1105. Data may be obtained from user-input and user-generated content 1106, from a user-specified list, user favorites, or user history 1110. Databases may be network-connected 1107, embedded within the software 1108, or reachable via web search 1109. Data may be obtained from aggregate listings from affiliate networks 1111. Data may be obtained from a dynamic bidding system 1112, where merchants for example may bid by specifying a referral fee. Data in the database may be ranked in any desired manner, for example by user reviews/ratings, third party ratings, or user preferences 1113. Data may be obtained from external databases or services indexed for example by SKUs, barcodes, or any other identifier of a product, service, or merchant. These examples are illustrative; one or more embodiments may obtain data on merchants, products, services, referral fees, merchant locations, the availability of inventory, ratings or reviews related to merchants, products, or services, prices, or any attributes of these items from any desired data source, in any desired format.

Figure 12:
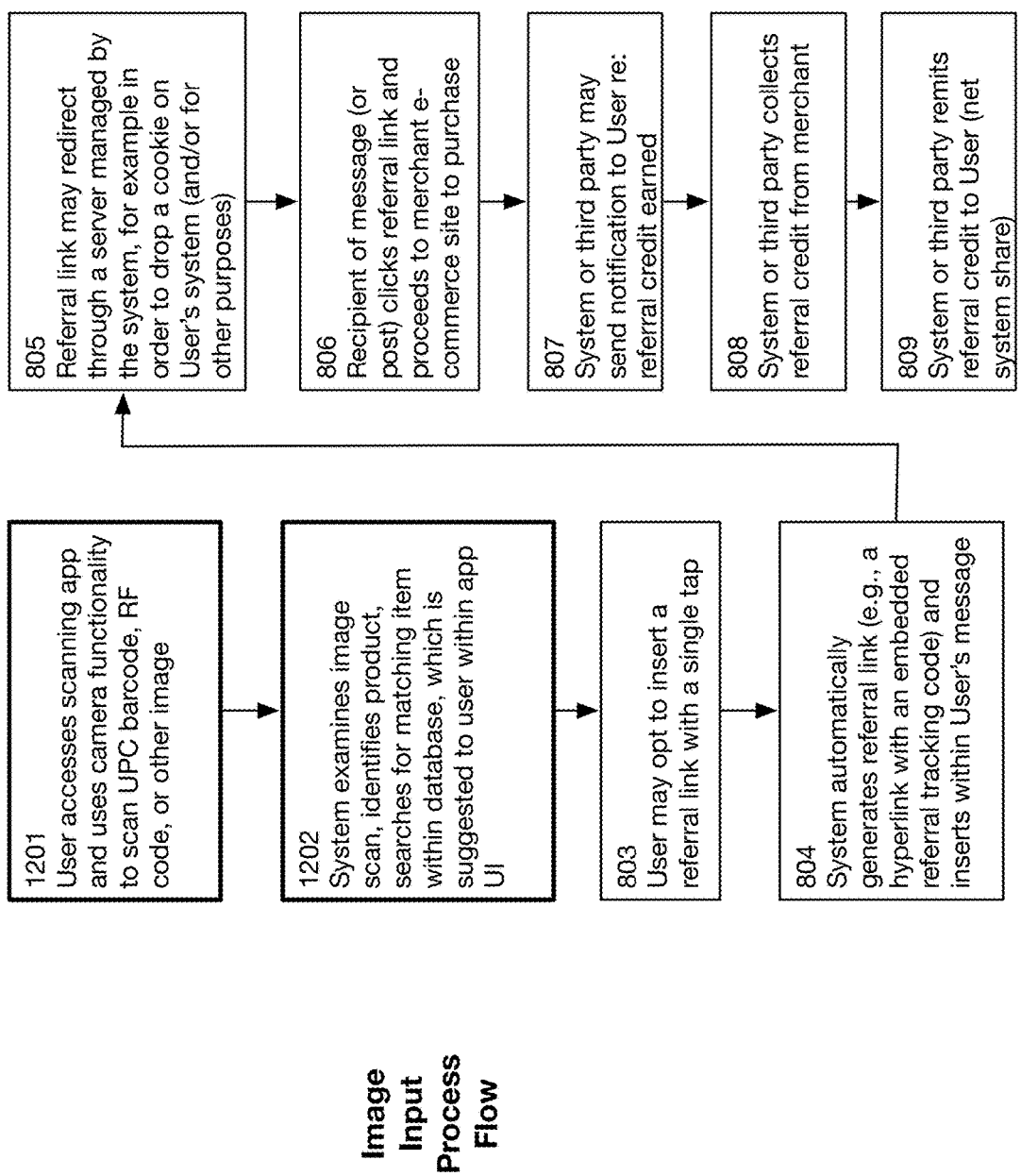
FIG. 12 shows a variation of the process flow of FIG. 8, where input for a referral is received from an image instead of from a keyboard.

FIG. 12 illustrates a variation of the flowchart of FIG. 8, where input is obtained from an image rather than from a keyboard. In step 1201, the user captures an image such as a barcode, QR code, or a product image, for example using a camera integrated into or reachable via a user's device, or by selecting a previously captured or otherwise accessible image on the user's device or accessible via a network connection. In step 1202, the referral matcher analyzes the image to determine which products, services, or merchants match the image, and it may suggest this referral to the user. The remaining steps in this process flow may be similar to those described with respect to FIG. 8.

Figure 13:
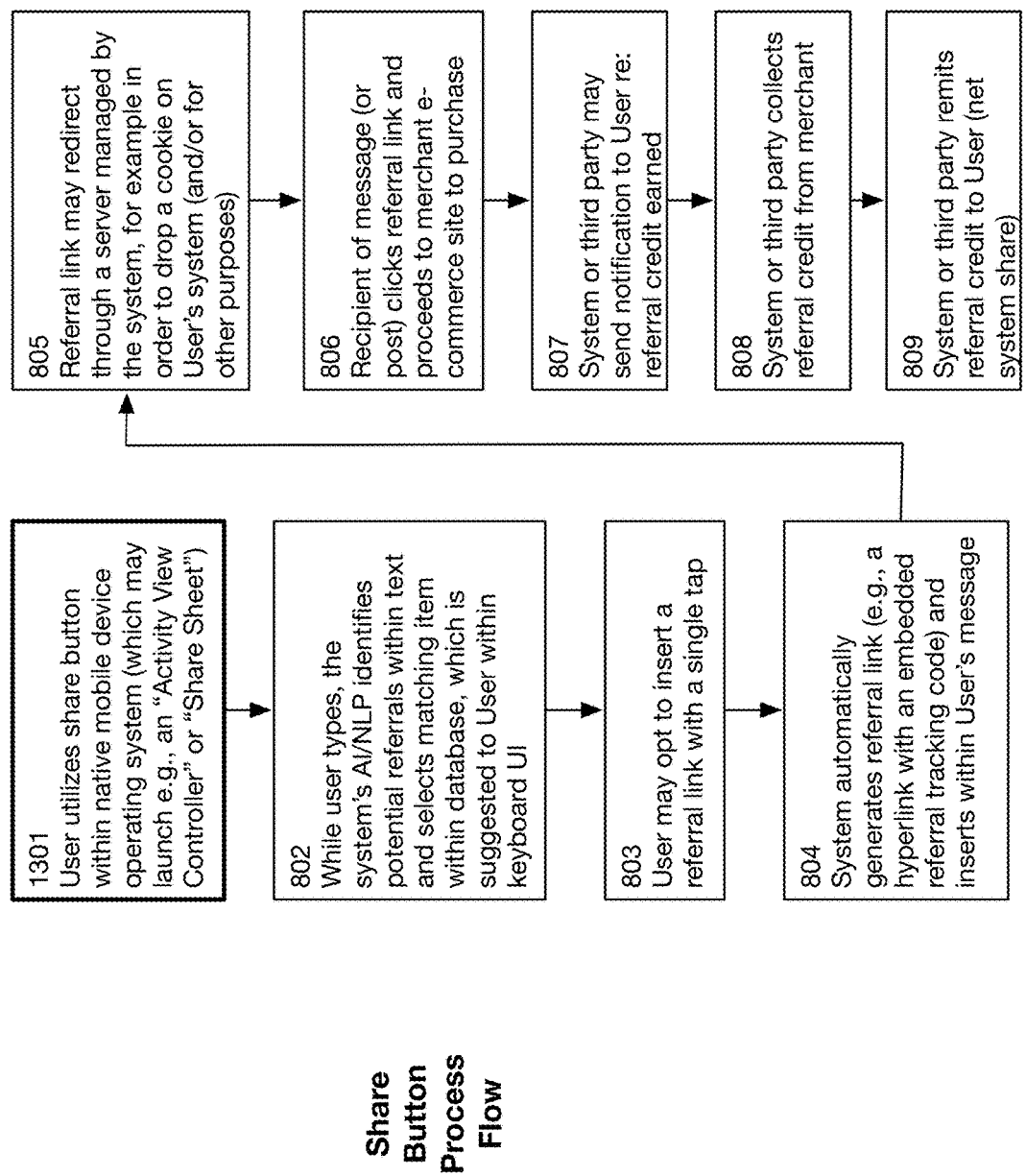
FIG. 13 shows a variation of the process flow of FIG. 8, where a referral is initiated via a share button.

FIG. 13 illustrates a variation of the flowchart of FIG. 8, where input is obtained via a share button instead of or in addition to from a keyboard. In step 1301, the user uses a share button to share an item; the share button may for example launch a "share sheet" with sharing options that depend on the item being shared. The shared content is then analyzed in step 802, and additional steps in the process flow may be similar to those described with respect to FIG. 8.

Figure 14:
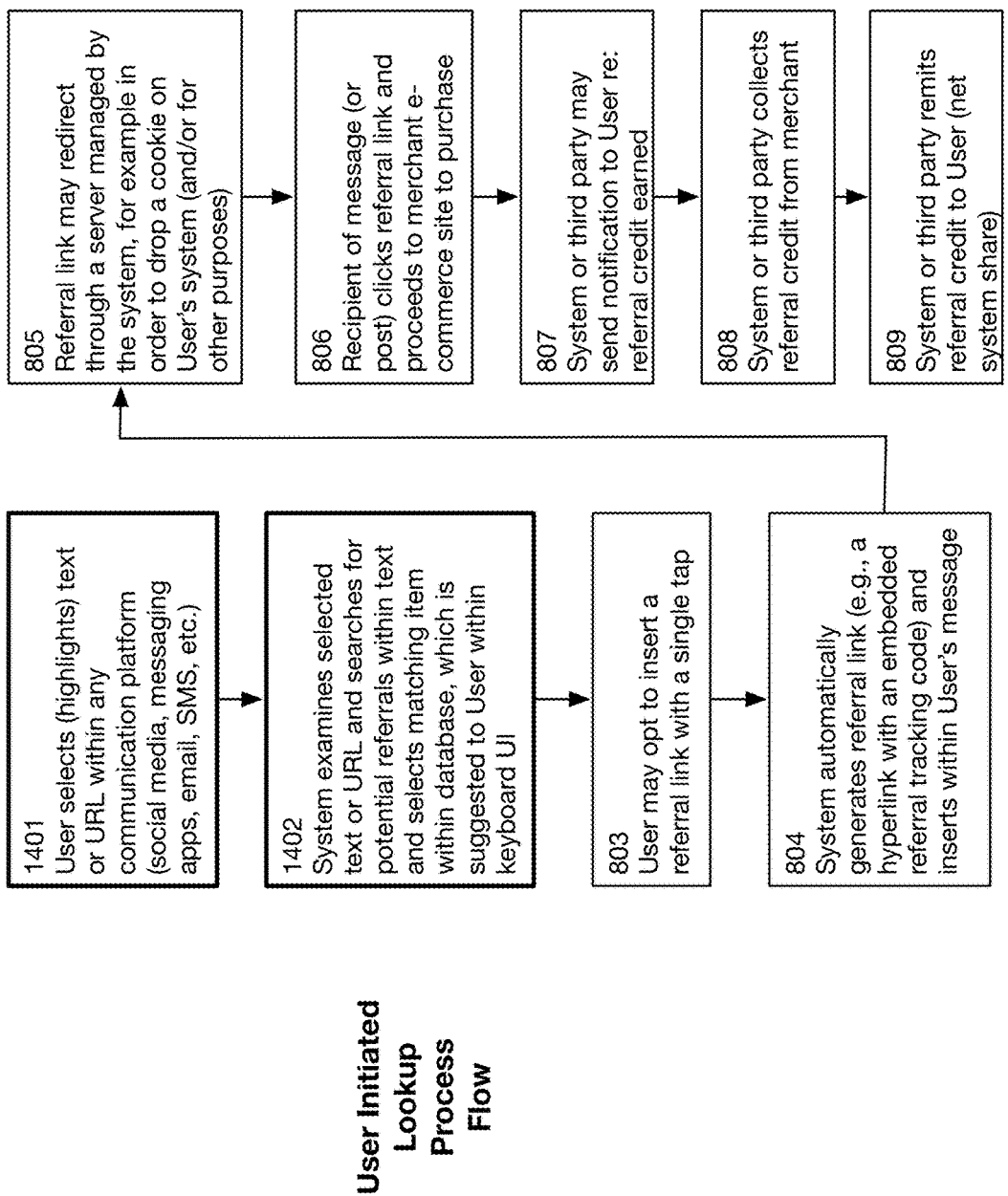
FIG. 14 shows a variation of the process flow of FIG. 8, where a referral is initiated when a user selects text or a URL and searches for matching potential referrals.

FIG. 14 illustrates a variation of the flowchart of FIG. 8, where input is obtained from a user selection instead of from keystrokes of a keyboard as the user types. In step 1401, the user selects text, a URL, or any other item, within any application. In step 1402, the referral matcher analyzes the selected information to identify one or more matching products, services, or merchants in the database; it may then present the match or matches to the user as a suggestion, for example as part of a keyboard app. In another variation, the matcher may work continuously in the background to match the user's input, and may respond with suggestions only when the user requests the matching referrals. The remaining steps in this process flow may be similar to those described with respect to FIG. 8.

While the invention herein disclosed has been described by means of specific embodiments and applications thereof, numerous modifications and variations could be made thereto by those skilled in the art without departing from the scope of the invention set forth in the claims.

What is claimed is:

1. A virtual keyboard trackable referral system comprising:
a database comprising one or more of merchants, products, services; a virtual keyboard application that executes on an electronic device used by a first user to
generate a communication to a second user, wherein said virtual keyboard application comprises a user interface that accepts input from said first user to generate said communication between said first user and said second user;
a computer or server that executes specific instructions to implement a referral matcher coupled to said database and coupled to said virtual keyboard application, wherein said referral matcher is configured to
receive said input from said virtual keyboard application;
analyze said input from said virtual keyboard application to identify at least one item associated with said one or more of merchants, products, and services in said database that corresponds to said input before said communication is generated, wherein said analyze said input comprises performing language processing to identify one or more of words, phrases, content in the input that are associated with said one or more of merchants, products and services in said database, compare said one or more of words, phrases and content in the input with said one or more of merchants, products and services in said database to identify said at least one item, and
identify said at least one item from said database as a match with said input;

accept an indication from said first user of which of said at least one item to utilize based on said indication from said first user or a previous preference accepted from said first user to yield a selected item;

generate a referral link as a referral comprising an embedded referral tracking code after said selected item is identified, and that comprises a link to a site associated with said at least one item that matches said input, and an identifier of said first user; and, insert said referral link into said communication from said first user to said second user within said input from said first user;

a referral tracker coupled to said site wherein said referral tracker is configured to generate a referral credit associated with an action at said site when said second user accesses said site via said referral link associated with said communication and when said second user performs a task at said site, and associate said referral credit with said first user after said second user accesses said site via said referral link associated with said communication and after said second user performs said task at said site.

2. The system of claim 1, wherein said communication comprises one or more of a text message, an email message, a Twitter® message, a Snapchat® message, a voice message, a video message, a picture message, a Facebook® post, a posting on a social media site, a posting on a message board, and a communication via a social messaging app.

3. The system of claim 1, wherein said virtual keyboard application is coupled to a plurality of communication applications on said device; and, when said first user uses each communication application of said plurality of communication applications to generate said communication to said second user, said referral matcher is further configured to analyze said input from said virtual keyboard application to identify said at least one item in said database that matches said input, wherein said input from said virtual keyboard application is transmitted to said communication application;

generate said referral link; and, insert said referral link into said communication to said second user.

4. The system of claim 1, wherein said language processing comprises natural language processing.

5. The system of claim 1, wherein said virtual keyboard application is configured to present said at least one item to said first user as one or more of a completion suggestion input, a replacement input and an augmentation input; and, when said first user accepts one or more of said completion suggestion input, said replacement input and said augmentation input, said referral matcher inserts said referral link into said communication to said second user.

6. The system of claim 1, wherein when said at least one item in said database that matches said input comprises a plurality of items, said referral matcher is further configured to select a specific item from said plurality of items; and, place a link to a site associated with said specific item in said referral link.

7. The system of claim 6, wherein said select said specific item from said plurality of items comprises prompt said first user to select said specific item.

8. The system of claim 6, wherein said select said specific item from said plurality of items comprises compare said plurality of items on a performance metric; and, select an item from said plurality of items with a best performance metric.

9. The system of claim 8, wherein said performance metric comprises one or more of an amount of referral credit associated with said item;

a price associated with said item;

a location associated with said item;

a speed of fulfillment associated with said item; and, a review score or a rating score associated with said item.

10. The system of claim 1, wherein said site comprises an intermediate server, wherein when said second user accesses said site via said referral link, said intermediate server is configured to identify one or more destinations that match said referral link;

select a specific destination from said one or more destinations; and, redirect said second user to said specific destination.

11. The system of claim 10, wherein said select said specific destination from said one or more destinations that match said referral link comprises compare said one or more destinations on a performance metric; and, select a destination from said one or more destinations with a best performance metric.

12. The system of claim 11, wherein said performance metric comprises one or more of an amount of referral credit associated with said destination;

a price associated with said destination;

a location associated with said destination;

a speed of fulfillment associated with said destination; and, a review score or a rating score associated with said destination.

13. The system of claim 1, wherein said referral credit comprises a reward that is provided to said first user or a donation made on behalf of said first user.

14. The system of claim 1, wherein said referral credit comprises a reward that is provided to a group of users.

15. The system of claim 5, wherein said first user accepts one or more of said completion suggestion input, said replacement input and said augmentation input via a single tap on said at least one item presented to said first user.

16. The system of claim 1, wherein said referral matcher is further configured to accept an image input; and, analyze said image input to identify at least one item in said database that matches said image input.

17. The system of claim 16, wherein said image input comprises a barcode or QR code.

18. The system of claim 1, wherein said referral matcher is further configured to accept an audio input; and, analyze said audio input to identify at least one item in said database that matches said audio input.

19. The system of claim 18, wherein said analyze said audio input comprises perform voice recognition on said audio input.

20. The system of claim 1, wherein said referral matcher is further configured to accept shared content received from one or more of another application;

a system service; and, a web page; and, analyze said shared content to identify at least one item in said database that matches said shared content.

21. The system of claim 1, wherein said referral tracker is further configured to provide said first user with one or more messages comprising information associated with said referral link and said referral credit after said communication is sent to said second user.

22. The system of claim 1, wherein said computer or said server is configured to execute said referral tracker.

23. The system of claim 1, further comprising multiple computers, wherein said computer or said server comprises a first computer selected from said multiple computers and wherein said referral tracker is further configured to execute on a second computer selected from said multiple computers.

* * * * *